(12) United States Patent
Silvi et al.

(10) Patent No.: US 7,226,989 B2
(45) Date of Patent: Jun. 5, 2007

(54) METHOD OF SEPARATING A POLYMER FROM A SOLVENT

(75) Inventors: Norberto Silvi, Clifton Park, NY (US); Mark H. Giammattei, Selkirk, NY (US); Paul W. Buckley, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/145,816

(22) Filed: Jun. 6, 2005

(65) Prior Publication Data

US 2005/0234219 A1   Oct. 20, 2005

Related U.S. Application Data

(62) Division of application No. 10/648,524, filed on Aug. 26, 2003, now Pat. No. 6,949,622.

(51) Int. Cl.
*C08F 6/10* (2006.01)

(52) U.S. Cl. .............. 528/481; 528/203; 528/499; 528/500; 528/501; 525/390

(58) Field of Classification Search .......... 528/481, 528/499, 501, 50, 203, 500; 525/390
See application file for complete search history.

(56) References Cited

U.S. PATENT DOCUMENTS

| | | | |
|---|---|---|---|
| 3,535,737 A | 7/1967 | Hendry | |
| 3,451,462 A | 6/1969 | Szabo et al. | |
| 3,803,085 A | 4/1974 | Takehoshi | |
| 3,833,514 A | 9/1974 | Takekoshi et al. | |
| 3,905,942 A | 9/1975 | Takekoshi et al. | |
| 3,917,507 A | 11/1975 | Skidmore | |
| 3,963,558 A | 6/1976 | Skidmore | |
| 3,991,004 A | 11/1976 | Takekoshi et al. | |
| 3,998,840 A | 12/1976 | Williams, III et al. | |
| 4,011,198 A | 3/1977 | Takekoshi et al. | |
| 4,110,843 A | 8/1978 | Skidmore | |
| 4,117,548 A | 9/1978 | Craig | |
| 4,161,470 A | 7/1979 | Calundann | |
| 4,198,265 A | 4/1980 | Johnson | |

(Continued)

FOREIGN PATENT DOCUMENTS

CA   1063761   10/1979

(Continued)

OTHER PUBLICATIONS

Kirk-Othmer Encyclopedia of Chemical Technology, Plastics Processing, Thermoplastic Resins, (3 pages).*

(Continued)

*Primary Examiner*—Irina S. Zemel
(74) *Attorney, Agent, or Firm*—Cantor Colburn LLP

(57) ABSTRACT

A method of separating a polymer-solvent mixture is described wherein a polymer-solvent mixture is heated prior to its introduction into an extruder comprising an upstream vent and/or a side feeder vent to allow flash evaporation of the solvent, and downstream vents for removal of remaining solvent. The one-step method is highly efficient having very high throughput rates while at the same time providing a polymer product containing low levels of residual solvent.

20 Claims, 4 Drawing Sheets

U.S. PATENT DOCUMENTS

| | | | |
|---|---|---|---|
| 4,324,882 A | 4/1982 | Takekoshi | |
| 4,369,278 A | 1/1983 | Kasahara et al. | |
| 4,423,960 A | 1/1984 | Anders | |
| 4,443,591 A | 4/1984 | Schmidt et al. | |
| 4,511,535 A | 4/1985 | Schmidt et al. | |
| 4,664,972 A | 5/1987 | Connolly | |
| 4,686,279 A | 8/1987 | Nagtzaam et al. | |
| 4,808,262 A | 2/1989 | Aneja et al. | |
| 4,831,115 A | 5/1989 | Golba, Jr. et al. | |
| 4,877,390 A | 10/1989 | Ocker et al. | |
| 4,902,455 A | 2/1990 | Wobbe | |
| 4,992,222 A | 2/1991 | Banevicius et al. | |
| 5,100,728 A * | 3/1992 | Plamthottam et al. | 428/345 |
| 5,102,591 A | 4/1992 | Hasson et al. | |
| 5,204,410 A | 4/1993 | Banevicius et al. | |
| 5,283,021 A | 2/1994 | Shih | |
| 5,324,795 A | 6/1994 | Suenaga | |
| 5,338,112 A | 8/1994 | Boden et al. | |
| 5,804,111 A | 9/1998 | Kobayashi et al. | |
| 6,024,479 A | 2/2000 | Haring | |
| 6,100,366 A | 8/2000 | Nakata et al. | |
| 6,365,710 B1 | 4/2002 | Wang et al. | |
| 6,506,871 B1 | 1/2003 | Silvi et al. | |
| 6,924,350 B2 | 8/2005 | Dong et al. | |
| 6,949,622 B2 | 9/2005 | Silvi et al. | |
| 2001/0000520 A1 | 4/2001 | Braat et al. | |
| 2002/0055608 A1 | 5/2002 | Braat et al. | |
| 2002/0062054 A1 | 5/2002 | Cistone et al. | |
| 2003/0067089 A1 | 4/2003 | Wang et al. | |
| 2003/0232957 A1 | 12/2003 | Silvi et al. | |
| 2003/0236334 A1 | 12/2003 | Silvi et al. | |
| 2006/0089487 A1 | 4/2005 | Silvi et al. | |
| 2005/0234218 A1 | 10/2005 | Silvi et al. | |

FOREIGN PATENT DOCUMENTS

| | | | |
|---|---|---|---|
| EP | 0 102 122 | | 8/1983 |
| GB | 1 213 467 | | 11/1970 |
| JP | 61130307 A | * | 6/1986 |
| JP | 61-120803 | * | 7/1986 |
| WO | WO 02/31033 | | 4/2002 |
| WO | WO 03/106149 1 | | 12/2003 |

OTHER PUBLICATIONS

JP11268098. Publication Date Oct. 5, 1999. Abstract Only.
JP58147332. Publication Date Sep. 2, 1983. Abstract Only.
JP6093014. Publication Date Apr. 5, 1994. Abstract Only.
Bash, et al. "Analyzing DevolatilizationExtruders for REsiduals Optimization" Antac 96 pp. 356-359.
European Search Report; European Application No. 04255152.3-2109; Mailing Date: Dec. 9, 2004; European Reference: RD-28684/10129; 3 pages.
International Search Report; International Application No. PCT/US2004/022194 International Filing Date Aug. 7, 2004; Date Mailed Mar. 11, 2004; 11 pages.

* cited by examiner

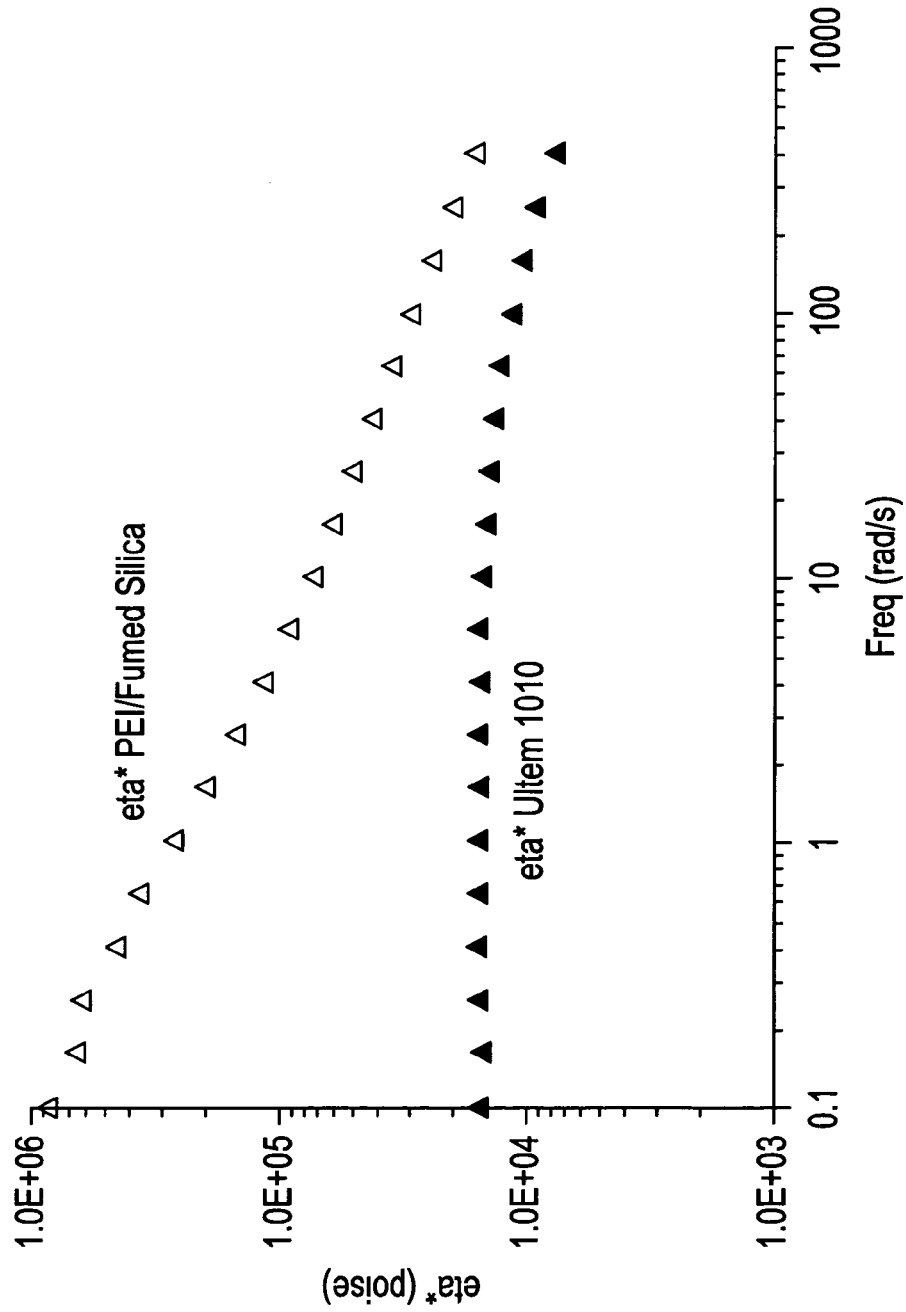

METHOD OF SEPARATING A POLYMER FROM A SOLVENT

CROSS-REFERENCE TO RELATED APPLICATIONS

This application is a divisional application of U.S. patent application Ser. No. 10/648,524, filed Aug. 26, 2003, now U.S. Pat. No. 6,949,622 which is incorporated herein in its entirety.

BACKGROUND OF THE INVENTION

The preparation of polymeric materials is frequently carried out in a solvent from which the polymer product must be separated prior to molding, storage, or other such applications. This is the case in the manufacture of polyetherimide prepared by condensation polymerization of a dianhydride with a diamine in ortho-dichlorobenzene solution. Many other polymers are similarly prepared in solution and require a solvent removal step in order to isolate the polymer product. Illustrative polymers include interfacially-prepared polycarbonates, polysulfones, interfacially-prepared polycarbonate esters, and the like. The solvent frequently plays an indispensable role in polymer manufacture, providing for thorough mixing of reactants and for reducing the viscosity of the reaction mixture to provide for uniform heat transfer during the polymerization reaction itself. The solvent may further facilitate product purification by enabling the polymer product to be treated with water, aqueous acids and bases, and drying agents prior to solvent removal. Additionally, because a polymer solution is typically much less viscous than a molten polymer, the polymer solution is generally more easily filtered than the molten polymer.

Due to the pervasive use of solvent solutions in the manufacture or processing of polymeric material, there remains a need in the art to provide a convenient and cost-effective method and system to isolate a polymer from a polymer-solvent mixture.

The formation of blends or filled polymeric material may be effected by compounding a melt of the polymer with the additional polymer or filler. To prepare a polymer product having uniformly dispersed filler or to uniformly disperse an additional polymer, high shear rates, extended compounding and extruding times, and high heat may be required. The long residence times of compounding and high heat render the polymer product susceptible to discoloration and degradation of desired physical properties.

There also remains a need for an efficient and simple method to prepare a polymer product comprising uniformly dispersed filler.

BRIEF SUMMARY OF THE INVENTION

Disclosed herein is a method for separating a polymer from a solvent comprising introducing a superheated polymer-solvent mixture to an extruder, wherein the extruder comprises an upstream vent and a downstream vent; removing solvent from the superheated polymer-solvent mixture via the upstream vent and the downstream vent; and isolating a polymer product from the superheated polymer-solvent mixture; and wherein the polymer-solvent mixture comprises a polymer and a solvent, wherein the amount of polymer in the polymer-solvent mixture is less than or equal to about 75 weight percent based on the total weight of polymer and solvent.

In another embodiment, a system for separating a polymer from a solvent comprises a means for superheating a polymer-solvent mixture; and an extruder in communication with the means for superheating a polymer solvent mixture, wherein the extruder comprises an upstream vent and a downstream vent.

In yet another embodiment, a method of preparing a filled polymer comprises introducing a superheated polymer-solvent mixture to an extruder, wherein the extruder comprises an upstream vent and a downstream vent, and wherein the superheated polymer-solvent mixture comprises a filler; removing solvent from the superheated polymer-solvent mixture via the upstream vent and the downstream vent; and isolating a filled polymer from the polymer-solvent mixture, wherein the polymer comprises a filler.

BRIEF DESCRIPTION OF DRAWINGS

FIG. 5 illustrates a rheology graph for a polyetherimide-fumed silica blend and polyetherimide control.

DETAILED DESCRIPTION OF THE INVENTION

Figure 1:
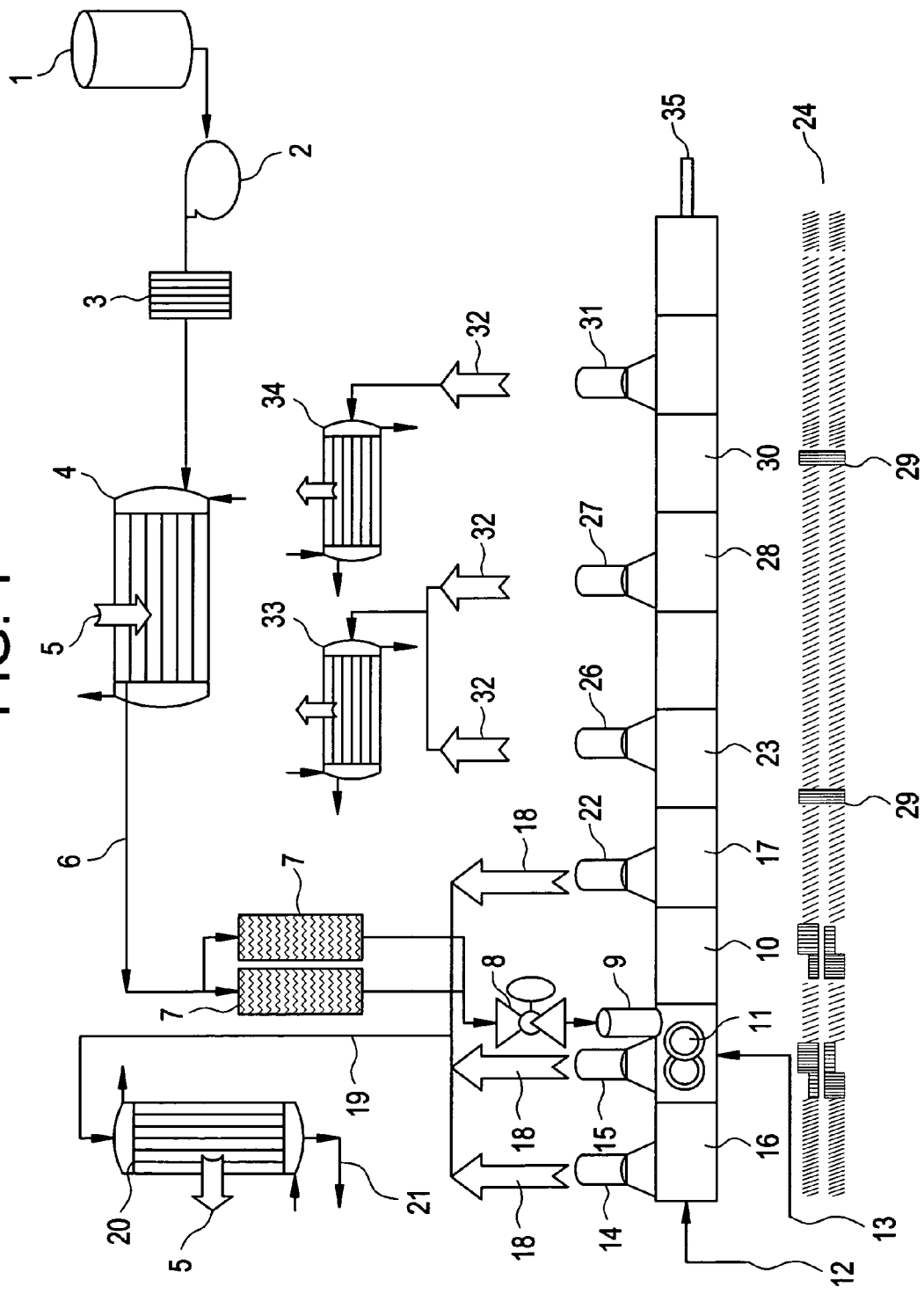
FIG. 1 illustrates one embodiment of a system for separating a polymer-solvent mixture, the system comprising a side feeder with a vent and a twin-screw extruder having one upstream vents and four downstream vents.

Disclosed herein are methods of separating polymer-solvent mixtures into their polymer and solvent components. Also disclosed are systems for effecting the separation of polymer-solvent mixtures. Finally, a method of preparing a polymer product comprising uniformly dispersed filler is disclosed.

The singular forms "a," "an," and "the" include plural referents unless the context clearly dictates otherwise.

"Optional" or "optionally" means that the subsequently described event or circumstance may or may not occur, and that the description includes instances where the event occurs and instances where it does not.

As used herein, the term "substantially all" means 95 percent or more.

As used herein, a polymer "substantially free of solvent" contains less than about 1000 parts per million solvent.

As used herein, the term "solvent" can refer to a single solvent or a mixture of solvents.

In one aspect, a method relates to separating a polymer from a solvent. Typically polymer-solvent mixtures are solutions, which comprise one or more polymers dissolved in one or more solvents. Alternatively, a polymer-solvent mixture may be one or more solvents dissolved in one or more polymers, for example, in a polyetherimide containing ortho-dichlorobenzene (ODCB), or polyetherimide-polyphenylene ether containing ODCB. Also contemplated as polymer-solvent mixtures are polymer and solvent and further including a filler and/or an additive.

As noted, a method for separating polymer-solvent mixtures and an apparatus, herein referred to as a system, for accomplishing the same is disclosed. In an exemplary embodiment, the polymer-solvent mixture may be fed into a vented extruder configured to have sufficient volume to permit efficient flash evaporation of solvent from the polymer-solvent mixture, for even very dilute solutions. Preferably the polymer-solvent mixture is heated prior to being feed into the extruder. Heating vessels are suitable for holding the polymer-solvent mixture prior to its introduction into the extruder. The heated polymer-solvent mixture may further be heated by means of a heat exchanger or exchangers. Pumps such as gear pumps may be used to transfer the polymer-solvent mixture through one or more heat exchangers.

The feed inlet through which the polymer-solvent mixture is fed to the feed zone of the extruder may be in close proximity to a nearby vent. The extruder vent upstream of the feed inlet, which is used to effect the bulk of the solvent removal, is herein described as an upstream vent. The upstream vent may be operated at atmospheric or subatmospheric pressure. The extruder, the feed inlet, and the upstream vent are configured to provide the volume needed to permit efficient flash evaporation of solvent from the polymer-solvent mixture. A vent located downstream of the feed port of the extruder is typically run at atmospheric pressure, but preferably at subatmospheric pressure and is described herein as a downstream vent.

The extruder may further comprise a side feeder equipped with a side feeder vent which provides for added volume and serves to trap and return polymer particles entrained by the escaping solvent vapors. The upstream vent nearby the feed inlet and the side feeder vent may be operated at atmospheric or subatmospheric pressure. A downstream vent completes the solvent removal process to provide a polymer product substantially free of solvent.

According to one embodiment, the polymer-solvent mixture is first heated under pressure to produce a superheated polymer-solvent mixture, wherein the temperature of the superheated mixture is greater than the boiling point of the solvent at atmospheric pressure. Typically, the temperature of the superheated polymer-solvent mixture will be about 2° C. to about 200° C. higher than the boiling point of the solvent at atmospheric pressure. Within this range, a temperature of less than or equal to about 150° C. can be employed, with less than or equal to about 100° C. preferred. Also preferred within this range is a temperature of greater than or equal to about 10° C., with greater than or equal to about 50° C. more preferred. In instances where there are multiple solvents present, the polymer-solvent mixture is superheated with respect to at least one of the solvent components. Where the polymer-solvent mixture contains significant amounts of both high and low boiling solvents, it is sometimes advantageous to superheat the polymer-solvent mixture with respect to all solvents present (i.e., above the boiling point at atmospheric pressure of the highest boiling solvent). Superheating of the polymer-solvent mixture may be achieved by heating the mixture under pressure.

Superheating may be described as the temperature a condensable gas is above its boiling point at its current pressure. The degree of superheat, $(P_1^v - P_t)$, to characterize superheating, may be defined as the difference between the equilibrium pressure of the solvent in the vapor phase $(P_1^v)$ and the total pressure in the space of the extruder where the devolatilization process takes place $(P_t)$ as a positive value. In another embodiment, the flash separation of the solvent from the polymer-solvent mixture may be accomplished by applying vacuum to the heated mixture so the surrounding pressure is lower than the vapor pressure of the solvent in the mixture. This method is also described herein as superheating as the degree of superheat $(P_1^v - P_t)$ is a positive value. A polymer-solvent mixture that is kept at a temperature below the boiling point of the solvent at atmospheric pressure can be in a superheated state as long as the surrounding pressure is lower than the vapor pressure of the solvent at the temperature of the mixture.

When the polymer-solvent mixture is pressurized, the system may comprise a pressure control valve downstream of the heat exchanger, if used, or downstream of the feed tank. The pressure control valve preferably has a cracking pressure higher than atmospheric pressure. The cracking pressure of the pressure control valve may be set electronically or manually and is typically maintained at from about 1 pounds per square inch (psi) (0.07 kgf/cm$^2$) to about 350 psi (25 kgf/cm$^2$) above atmospheric pressure. Within this range, a cracking pressure of less than or equal to about 100 psi (7.0 kgf/cm$^2$) can be employed, with less than or equal to about 50 psi (3.5 kgf/cm$^2$) above atmospheric pressure preferred. Also preferred within this range is a cracking pressure of greater than or equal to about 5 psi (0.35 kgf/cm$^2$), with greater than or equal to about 10 psi (0.7 kgf/cm$^2$) above atmospheric pressure more preferred. The back pressure generated by the pressure control valve is typically controlled by increasing or decreasing the cross sectional area of the valve opening. Typically, the degree to which the valve is open is expressed as percent (%) open, meaning the cross sectional area of valve opening actually being used relative to the cross sectional area of the valve when fully opened. The pressure control valve prevents evaporation of the solvent as it is heated above its boiling point. Typically, the pressure control valve is attached (plumbed) directly to an extruder and serves as the feed inlet of the extruder. A suitable pressure control valve includes a RESEARCH® Control Valve, manufactured by BadgerMeter, Inc.

Figure 2:
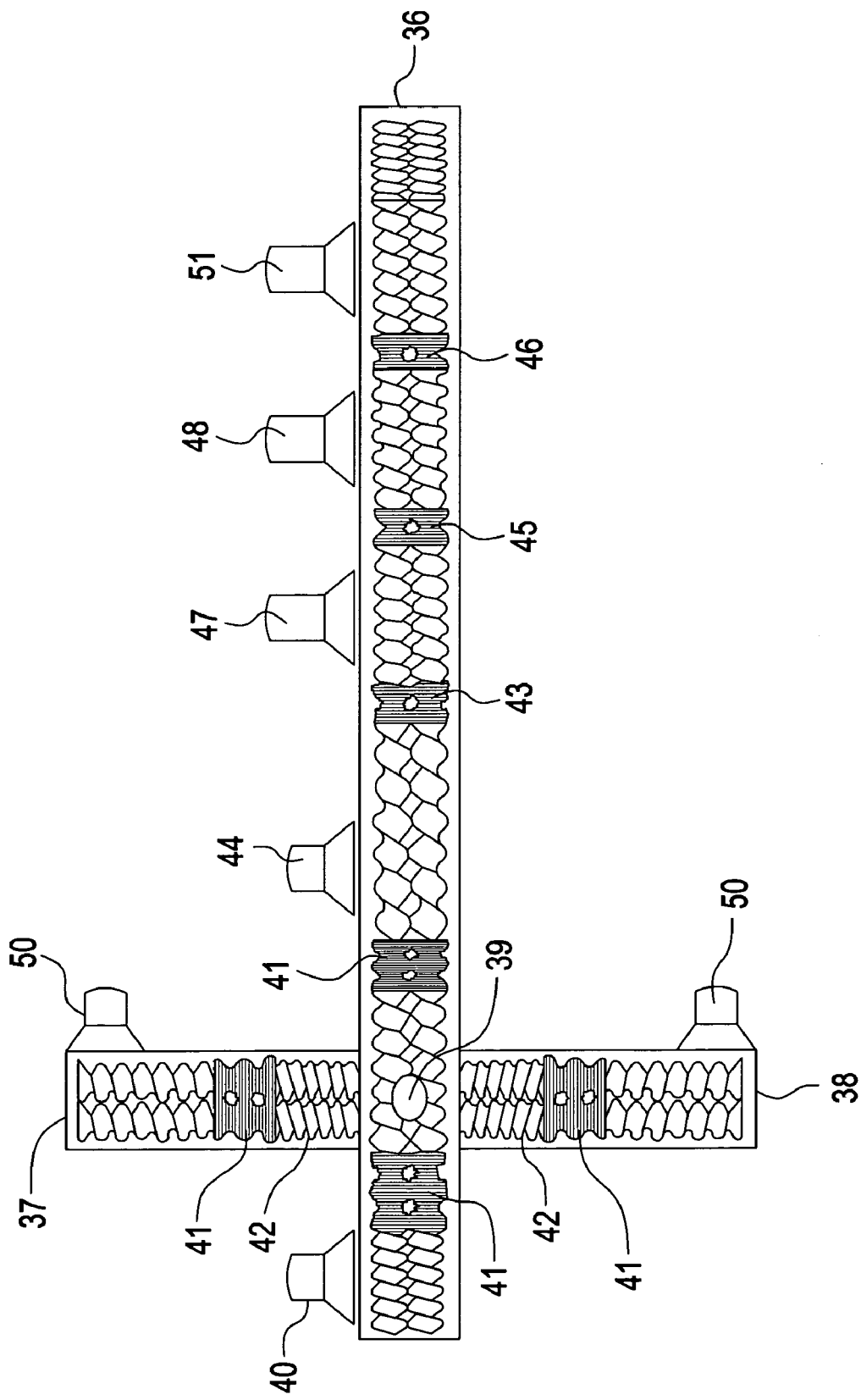
FIG. 2 illustrates another embodiment comprising two side feeders each equipped with a kneading block and vent.

As mentioned previously, the extruder may comprise a side feeder comprising a vent to aid in the removal of solvent from the polymer-solvent mixture. The extruder in combination with the side feeder is equipped with one or more vents in close proximity to the extruder feed inlet, such as a pressure control valve. The side feeder is typically positioned in close proximity to the feed inlet through which the polymer-solvent mixture is introduced into the extruder, preferably upstream from the feed inlet. For example, FIG. 2 illustrates an extruder (36) comprising two side feeders (37) and (38). Feed inlet (39) is shown in close proximity to the side feeders (37) and (38). It has been found advantageous that the side feeder comprises a feeder vent operated at about atmospheric pressure or subatmospheric pressure. Alternatively, a side feeder feed inlet may be attached to the side feeder itself in which instance the side feeder feed inlet is attached to the side feeder at a position between the point of attachment of the side feeder to the extruder and the side feeder vent. In yet another alternative, the polymer-solvent mixture may be introduced through feed inlets which may be attached to the side feeder, the extruder, or to both extruder and side feeder.

Typically, the side feeder used according to the method is short, having a length to diameter ratio (L/D) of about 20 or less, preferably about 12 or less. The side feeder is typically not heated and functions to provide additional cross sectional area within the feed zone of the extruder thereby allowing higher throughput of the solvent-polymer mixture. The side feeder may be of the single-screw or the twin-screw type. Typically, the twin-screw type side feeder is preferred. The screw elements of the side feeder are configured to convey polymer (which is deposited in the side feeder as the solvent rapidly evaporates) back to the main channel of the extruder. Typically, the side feeder is equipped with at least one vent located near the end of the side feeder most distant from the point of attachment of the side feeder to the extruder. In instances in which a pressure control valve is attached to the side feeder it is preferably attached between the side feeder vent and the point of attachment of the side feeder to the extruder.

As mentioned, the side feeder screw elements are conveying elements which serve to transport deposited polymer into the extruder. In one embodiment the side feeder screw elements comprise kneading elements in addition to conveying elements. Side feeders comprising kneading screw elements are especially useful in instances in which the evaporating solvent has a tendency to entrain polymer particles in a direction opposite that provided by the conveying action of the side feeder screw elements and out through the vent of the side feeder. The extruder can be similarly equipped with kneading screw elements between the point of introduction of the polymer-solvent mixture and one or more of the upstream vents. As in the side feeder, the kneading extruder screw elements act as mechanical filters to intercept polymer particles being entrained by the solvent vapor moving toward the vents.

The extruder used in the method and system may comprise any number of barrels, type of screw elements, etc. as long as it is configured to provide sufficient volume for flash evaporation of the solvent as well as the downstream devolatilization of remaining solvent. Exemplary extruders include a twin-screw counter-rotating extruder, a twin-screw co-rotating extruder, a single-screw extruder, or a single-screw reciprocating extruder. A preferred extruder is the co-rotating, intermeshing (i.e. self wiping) twin-screw extruder.

In one embodiment, the extruder preferably has a set barrel temperature greater than 190° C., preferably greater than or equal to about 200° C. In one embodiment the extruder comprises heated zones. In one embodiment, the heated zones of the extruder are operated at one or more temperatures of 190° C. to about 400° C. The expression wherein the extruder is operated at a temperature of 190° C. to about 400° C. refers to the heated zones of the extruder, it being understood that the extruder may comprise both heated and unheated zones. Within this embodiment, the temperature of the heated zones may be greater than or equal to about 200° C., preferably greater than or equal to about 250° C., and even more preferably greater than or equal to about 300° C.

In general, as the feed rate of the polymer-solvent mixture is increased a corresponding increase in the screw speed must be made in order to accommodate the additional material being fed to the extruder. Moreover, the screw speed determines the residence time of whatever material is being fed to the extruder, here a polymer-solvent mixture. Thus, the screw speed and feed rate are typically interdependent. It is useful to characterize this relationship between feed rate and screw speed as a ratio. Typically the extruder is operated such that the ratio of starting material introduced into the extruder in kilograms per hour (kg/hr) to the screw speed expressed in revolutions per minute (rpm) falls about 0.0045 to about 45, preferably about 0.01 to about 0.45. For example, the ratio of feed rate to screw speed where the polymer-solvent mixture is being introduced into the extruder at 400 kilograms per hour into an extruder being operated at 400 rpm is 1. The maximum and minimum feed rates and extruder screw speeds are determined by, among other factors, the size of the extruder, the general rule being the larger the extruder the higher the maximum and minimum feed rates. In one embodiment the extruder operation is characterized by a ratio of a feed rate in kilograms per hour to an extruder screw speed in revolutions per minute, the ratio being between about 0.0045 and about 45. In an alternate embodiment the extruder operation is characterized by a ratio of a feed rate in pounds per hour to an extruder screw speed in revolutions per minute, the ratio being between about 0.01 and about 0.45.

The system may optionally further comprise one or more condensing systems to collect the solvent removed by the upstream vent, downstream vent and/or side feeder vent. The vents may be connected to a solvent removal and recovery manifold comprising solvent vapor removal lines, a condenser and a liquid solvent receiving vessel. Any solvent collection system known in the art may be used to effect the solvent recovery via the vents.

In one embodiment the superheated polymer-solvent mixture passes through the pressure control valve into the feed zone of the extruder, which due to the presence of the aforementioned vents (upstream extruder vent and/or side feeder vent) may be at atmospheric pressure. The solvent present in the superheated polymer-solvent mixture undergoes sudden and rapid evaporation thereby effecting at least partial separation of the polymer and solvent, the solvent vapors emerging through the upstream vents. Additionally, the extruder is equipped with at least one downstream vent operated at subatmospheric pressure, which serves to remove solvent not removed through the upstream vent and/or side feeder vent. One downstream vent may be used, but preferably at least two downstream vents are used. Generally, from about 50 to about 99 percent, preferably from about 90 to about 99 percent of the solvent present in the initial polymer-solvent mixture is removed through the upstream vent and/or side feeder vent and a substantial portion of any solvent remaining is removed through the downstream vent operated at subatmospheric pressure.

The vent operated at about atmospheric pressure, whether it is an upstream vent or a side feeder vent, is operated at the pressure of the surroundings (in the absence of an applied vacuum), typically about 750 millimeters of mercury (mm of Hg) or greater.

The vent operated at subatmospheric pressure, whether it is an upstream vent, side feeder vent, or downstream vent, may be maintained at less than or equal to about 750 millimeters of mercury (mm of Hg), preferably about 25 to about 750 mm Hg as measured by a vacuum gauge. Within this range, the vent may be operated at greater than or equal to about 100 mm, preferably greater than or equal to about 250 mm and even more preferably greater than or equal to about 350 mm of mercury. Also within this range the vents may be operated at less than or equal to about 600 mm, preferably less than or equal to about 500 mm, and more preferably less than or equal to about 400 mm of mercury of vacuum.

In one embodiment, the upstream vent and side feeder vent surrounding the feed inlet of the extruder may be operated at subatmospheric pressure. In this embodiment, the pressure at the upstream vent and side feeder vent are selected and monitored during processing to prevent excessive foaming of the mixture that may result in clogging of the vents, side feeder and/or the condensing system downstream of the extruder.

In one embodiment the polymer-solvent mixture is introduced into an evaporator or distillation apparatus to concentrate the polymer-solvent mixture prior to its introduction to the extruder. The evaporator or distillation apparatus is preferably upstream from the extruder and in direct communication with the extruder via a pressure control valve attached directly to the extruder.

In one embodiment the superheated polymer-solvent mixture is introduced through multiple pressure control valves located on the extruder and the side feeder. A system comprising two side feeders and two pressure control valves, the first of the pressure control valves communicating directly with the feed zone of the extruder (i.e. attached directly to the extruder), and the second of the pressure control valves being attached to one of the side feeders, the second of the pressure control valves being said to communicate with the extruder via the side feeder. Alternatively, it is possible to have a system in which there is no pressure control valve in direct communication with the extruder, having instead multiple side feeders each of which is equipped with at least one pressure control valve.

In another preferred embodiment the polymer-solvent mixture is filtered prior to its introduction into the extruder. The polymer-solvent mixture may be filtered prior to and/or after heating or superheating.

The polymer-solvent mixture that is introduced into the extruder comprises a solvent and a polymer, wherein the amount of polymer is less than or equal to about 99 weight percent based on the total of polymer and solvent. Within this range the amount of polymer may be less than or equal to about 75 weight percent, with less than or equal to about 60 more preferred, and less than or equal to about 50 weight percent based on the total of polymer and solvent more preferred. Also within this range, the weight percent of polymer may be greater than or equal to about 5, with greater than or equal to about 20 preferred, and greater than or equal to about 40 weight percent based on the total of polymer and solvent more preferred.

Polymer-solvent mixtures comprising less than about 30 percent by weight solvent are at times too viscous to be pumped through a heat exchanger, one of the preferred methods for superheating the polymer-solvent mixtures. In such instances it is possible to superheat the polymer-solvent mixture by other means, for example, heating the polymer-solvent mixture in a extruder, or a helicone mixer, or the like. The polymer-solvent mixture may be superheated by means of a first extruder. The superheated polymer-solvent mixture emerging from the first extruder may be transferred through a pressure control valve into a second devolatilizing extruder equipped according to the method with at least one vent operated at subatmospheric pressure, optionally one or more vents operated at about atmospheric pressure, and at least one side feeder equipped with at least one vent being operated at atmospheric pressure. In one embodiment, the die face of the first extruder may serve as the pressure control valve, which regulates the flow of superheated polymer-solvent mixture into the second devolatilizing extruder. In this embodiment the superheated polymer-solvent mixture is introduced directly from the die face of the first extruder into the feed zone of the second devolatilizing extruder. The first extruder may be any single-screw extruder or twin-screw extruder capable of superheating the polymer-solvent mixture.

The polymer product emerges from the extruder as an extrudate, which may be pelletized and dried before further use. In some instances the polymer product, notwithstanding the action of the upstream, downstream, and/or side feeder vents present, may contain an amount of residual solvent which is in excess of a maximum allowable amount which renders the polymer unsuitable for immediate use in a particular application, for example a molding application requiring that the amount of residual solvent be less than about 100 parts per million based on the weight of the polymer product. In such instances it is possible to further reduce the level of residual solvent by subjecting the polymer product to an additional extrusion step. Thus, the extruder into which the polymer-solvent mixture is first introduced may be coupled to a second extruder, the second extruder being equipped with one or more subatmospheric or atmospheric vents for the removal of residual solvent. The second extruder may be closely coupled to the initial extruder thereby avoiding any intermediate isolation and re-melting steps. The use of a second extruder in this manner is especially beneficial during operation at high throughput rates where the residence time of the polymer in the initial extruder is insufficient to achieve the desired low level of residual solvent. The second extruder may be any vented extruder such as a vented twin-screw counter-rotating extruder, a vented twin-screw co-rotating extruder, a vented single-screw extruder, or a vented single-screw reciprocating extruder. The term vented extruder means an extruder possessing at least one vent, the vent being operated at atmospheric pressure or subatmospheric pressure. Where the extruder comprises a plurality of vents, some vents may be operated at atmospheric pressure while others are operated at subatmospheric pressure.

In another embodiment the polymer-solvent mixture is filtered in a solution filtration system prior to its introduction into the extruder. The polymer-solvent mixture may be filtered prior to and/or after heating or superheating to a temperature greater than the boiling point of the solvent. A preferred solution filtration system is one that is in direct communication with the extruder via a pressure control valve attached directly to the extruder. A highly preferred solution filtration system is an in-line metal filter. Alternatively, the extruder may optionally comprise a melt filtration system for filtering the polymer melt in the extruder.

The polymer-solvent mixture may comprise a wide variety of polymers. Exemplary polymers include polyetherimides, polycarbonates, polycarbonate esters, poly(arylene ether)s, polyamides, polyarylates, polyesters, polysulfones, polyetherketones, polyimides, olefin polymers, polysiloxanes, poly(alkenyl aromatic)s, and blends comprising at least one of the foregoing polymers. In instances where two or more polymers are present in the polymer-solvent mixture, the polymer product may be a polymer blend, such as a blend of a polyetherimide and a poly(arylene ether). Other blends may include a polyetherimide and a polycarbonate ester. It has been found that the pre-dispersal or pre-dissolution of two or more polymers within the polymer-solvent mixture allows for the efficient and uniform distribution of the polymers in the resulting isolated polymer product matrix.

As used herein, the term polymer includes both high molecular weight polymers, for example bisphenol A polycarbonate having a number average molecular weight $M_n$ of 10,000 atomic mass units (amu) or more, and relatively low molecular weight oligomeric materials, for example bisphenol A polycarbonate having a number average molecular weight of about 800 amu. Typically, the polymer-solvent mixture is a product mixture obtained after a polymerization reaction, or polymer derivatization reaction, conducted in a solvent. For example, the polymer-solvent mixture may be the product of the condensation polymerization of bisphenol A dianhydride (BPADA) with m-phenylenediamine in the presence of phthalic anhydride chainstopper in ODCB, or the polymerization of a bisphenol, such as bisphenol A, with phosgene conducted in a solvent such as methylene chloride. In the first instance, a water soluble catalyst is typically employed in the condensation reaction of BPADA with m-phenylenediamine and phthalic anhydride, and this catalyst can removed prior to any polymer isolation step. Thus, the product polyetherimide solution in ODCB is washed with water and the aqueous phase is separated to provide a water washed solution of polyetherimide in ODCB. In such an instance, the water washed solution of polyetherimide in ODCB may serve as the polymer-solvent mixture which is separated into polymeric and solvent components using the method described herein. Similarly, in the preparation of bisphenol A polycarbonate by reaction of bisphenol A with phosgene in a methylene chloride-water mixture in the presence of an inorganic acid acceptor such as sodium hydroxide, the reaction mixture upon completion of the polymerization is a two-phase mixture of polycarbonate in methylene chloride and brine. The brine layer is separated and the methylene chloride layer is washed with acid and pure water. The organic layer is then separated from the water layer to provide a water washed solution of bisphenol A polycarbonate in methylene chloride. Here again, the water washed solution of bisphenol A polycarbonate in methylene chloride may serve as the polymer-solvent mixture which is separated into polymeric and solvent components using the method described herein.

Polymer derivatization reactions carried out in solution are frequently employed by chemists wishing to alter the properties of a particular polymeric material. For example, polycarbonate prepared by the melt polymerization of a bisphenol such as bisphenol A with a diaryl carbonate such as diphenyl carbonate may have a significant number of chain terminating hydroxyl groups. It is frequently desirable to convert such hydroxyl groups into other functional groups such as esters by reacting the polycarbonate in solution with an electrophilic reagent such as an acid chloride, for example benzoyl chloride. Here, the polymer is dissolved in a solvent, the reaction with benzoyl chloride and an acid acceptor such as sodium hydroxide is performed and the reaction mixture is then washed to remove water soluble reagents and byproducts to provide a polymer-solvent mixture necessitating solvent removal in order to isolate the derivatized polymer. Such polymer-solvent mixtures may be separated into polymeric and solvent components using the method described herein.

In one embodiment the polymer-solvent mixture comprises a polyetherimide having structure I

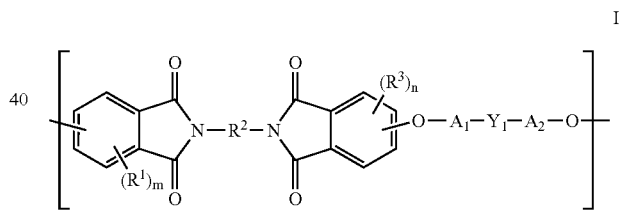

wherein $R^1$ and $R^3$ are independently at each occurrence halogen, $C_1$-$C_{20}$ alkyl, $C_6$-$C_{20}$ aryl, $C_7$-$C_{21}$ aralkyl, or $C_5$-$C_{20}$ cycloalkyl;
$R^2$ is $C_2$-$C_{20}$ alkylene, $C_4$-$C_{20}$ arylene, $C_5$-$C_{20}$ aralkylene, or $C_5$-$C_{20}$ cycloalkylene;
$A^1$ and $A^2$ are each independently a monocyclic divalent aryl radical, $Y^1$ is a bridging radical in which one or two carbon atoms separate $A^1$ and $A^2$; and m and n are independently integers from 0 to 3.

Polyetherimides having structure I include polymers prepared by condensation of bisphenol-A dianhydride (BPADA) with an aromatic diamine such as m-phenylenediamine, p-phenylene diamine, bis(4-aminophenyl)methane, bis(4-aminophenyl)ether, hexamethylenediamine; 1,4-cyclohexanediamine and the like.

The methods described herein are particularly well suited to the separation of polymer-solvent mixtures comprising one or more polyetherimides having structure I. Because the physical properties, such as color and impact strength, of polyetherimides I may be sensitive to impurities introduced during manufacture or handling, and because the effect of such impurities may be exacerbated during solvent removal, one aspect of the present method demonstrates its applicability to the isolation of polyetherimides prepared via distinctly different chemical processes.

One process for the preparation of polyetherimides having structure I is referred to as the nitro-displacement process. In the nitro displacement process, N-methylphthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4NPI and 5 parts of 3-NPI, is reacted in toluene with the disodium salt of bisphenol-A (BPA) in the presence of a phase transfer catalyst. This reaction gives BPA-bisimide and $NaNO_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternate chemical route to polyetherimides having structure I is a process referred to as the chloro-displacement process. The chloro displacement process is illustrated as follows: 4-chloro phthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischolorophthalimide is then subjected to polymerization by chloro displacement reaction with the disodium salt of BPA in the presence of hexaethylguanidinium chloride catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro displacement with BPA disodium salt as described above.

Polyetherimides prepared by nitro displacement or chloro displacement processes carried out on 4-NPI or bisphthalimide prepared from 4-chlorophthalic anhydride possess identical repeat unit structures, and materials of similar molecular weight should have essentially the same physical properties. A mixture of 3-NPI and 4-NPI ultimately affords, via the nitro displacement process, polyetherimide having the same physical properties as polyetherimide prepared in the chloro displacement process from a similarly constituted mixture of 3-chloro- and 4-chlorophthalic anhydride. Because the suite of impurities present in any polymer depends in part upon the method of its chemical synthesis, and because, as noted, the physical properties of polyetherimides are sensitive to the presence of impurities, a study was undertaken to determine whether the present method was applicable to the isolation of polyetherimides prepared by nitro displacement and chloro displacement without compromising the physical properties of either material. It has been found, and is well documented in the examples detailed herein, that the method may be applied to the isolation of both nitro displacement and chloro displacement polyetherimides without adversely affecting their physical properties. In some instances, as when the polymer contains insoluble particulate material, for example, dissolving the polymer in a solvent such as ODCB and filtering the solution to remove the insoluble particulate material followed by solvent removal according to the method allows recovery of polymer physical properties compromised by the presence of the insoluble particulate material. This effect of recovering polymer properties compromised by the presence of an impurity is observed in polyetherimides containing insoluble, dark particles (black specks) which are believed to act as stress concentrators during mechanical testing (e.g. Dynatup testing) and which negatively impact test scores.

The application of the method to a polymer-solvent mixture effects the separation of the solvent component from the polymeric component. The polymeric component emerging from the extruder is said to be devolatilized and is frequently referred to as the polymer product. In one embodiment, the polymer product is found to be substantially free of solvent. By substantially free it is meant that the polymer product contains less than 1000 parts per million (ppm) residual solvent based on the weight of the sample tested. In some instances the amount of residual solvent in the polymer product isolated may exceed 1000 ppm. The concentration of solvent in the final product correlates with the ratio between the feed rate and the extruder screw speed, with lower ratios (that is lower rates, or higher screw speeds, or both) leading to lower concentrations of solvent in the polymer product. The concentration of the solvent in the polymer product may be adjusted by adjusting the feed rate and/or the extruder screw speed.

In one embodiment, the method provides a polymer product which is substantially free of solvent and is a polyetherimide having structure I. In an alternate embodiment, the method provides a polymer blend, which is substantially free of solvent. Examples of polymer product blends which are substantially free of solvent include blends containing at least two different polymers selected from the group consisting of polycarbonates, polyetherimides, polysulfones, poly(alkenyl aromatic)s, and poly(arylene ether)s.

The polymer-solvent mixtures separated by the method may comprise one or more solvents. These solvents include halogenated aromatic solvents, halogenated aliphatic solvents, non-halogenated aromatic solvents, non-halogenated aliphatic solvents, and mixtures thereof. Halogenated aromatic solvents are illustrated by ortho-dichlorobenzene (ODCB), chlorobenzene and the like. Non-halogenated aromatic solvents are illustrated by toluene, xylene, anisole, and the like. Halogenated aliphatic solvents are illustrated by methylene chloride; chloroform; 1,2-dichloroethane; and the like. Non-halogenated aliphatic solvents are illustrated by ethanol, acetone, ethyl acetate, and the like.

In one embodiment, the method may further comprise a compounding step. An additive, a filler, or an additional polymer may be added to the polymer-solvent mixture via the extruder which further comprises a non-venting side feeder. A non-venting side feeder differs from the side feeder mentioned previously in that the non-venting side feeder does not function to vent solvent vapors from the extruder. Such an embodiment is illustrated by the case in which an additive, such as a flame retardant or an additional polymer, is preferably introduced at a point along the extruder barrel downstream of most or all vents that are present on the extruder barrel for the removal of solvent. The additive so introduced is mixed by the action of the extruder screws with the partially or fully devolatilized polymer and the product emerges from the extruder die face as a compounded polymeric material. When preparing compounded polymeric materials in this manner it is at times advantageous to provide for additional extruder barrels and to adapt the screw elements of the extruder to provide vigorous mixing down stream of the point along the barrel at which the additive is introduced. The extruder may comprise a vent downstream of the non-venting side feeder to remove volatiles still remaining, or that may have been produced by the side feeder addition of the additive, filler, and/or additional polymer to the extruder.

As mentioned above, the additional polymer introduced in the compounding step may include a polyetherimide, a polycarbonate, a polycarbonate ester, a poly(arylene ether), a polyamide, a polyarylate, a polyester, a polysulfone, a polyetherketone, a polyimide, an olefin polymer, a polysiloxane, a poly(alkenyl aromatic), and a combination comprising at least one of the foregoing polymers, and the like.

Non-limiting examples of fillers include silica powder, such as fused and fumed silicas and crystalline silica; talc; glass fibers; carbon black; conductive fillers; carbon nanotubes; nanoclays; organoclays; a combination comprising at least one of the foregoing fillers; and the like.

The amount of filler present in the polymer can range anywhere of about 0 to about 50 weight percent based on the total weight of the composition, preferably from about 0 to about 20 weight percent thereof.

The additives include, but are not limited to, colorants such as pigments or dyes, UV stabilizers, antioxidants, heat stabilizers, foaming agents, and mold release agents. Where the additive is one or more conventional additives, the product may comprise about 0.0001 to about 10 weight percent of the desired additives, preferably about 0.0001 to about 1 weight percent of the desired additives.

In another embodiment, the polymer-solvent mixture may further comprise at least one filler and/or at least one additive prior to its introduction into the extruder. It has been found that the pre-dispersal of filler into the polymer-solvent mixture allows for the efficient and uniform distribution of the filler in the resulting isolated polymer product matrix. The lower viscosity of the polymer-solvent mixture allows for efficient mixing of the filler and polymer with a minimized usage of energy as compared to compounding the filler and polymer in an extruder or similar device. Accordingly, a one-step process of compounding/isolation/devolatilization is disclosed to provide filled polymer product without the need for the usual remelting and compounding of the polymer and filler after the isolation step has been performed. A further advantage of adding the filler to the polymer-solvent mixture rather than compounding it in an extruder is to minimize the heat history of the polymer.

In one embodiment, the polymer-solvent mixture further comprises a liquid crystalline polymer, such as liquid crystalline polyester and copolyesters. Suitable liquid crystalline polymers are described in U.S. Pat. Nos. 5,324,795; 4,161,470; and 4,664,972.

The fillers and additives that may be dispersed in the polymer-solvent mixture may be any of those listed for the additional compounding step above.

Polymeric materials isolated according to the methods described herein may be transformed into useful articles directly, or may be blended with one or more additional polymers or polymer additives and subjected to injection molding, compression molding, extrusion methods, solution casting methods, and like techniques to provide useful articles. Injection molding is frequently the more preferred method of forming the useful articles.

In one embodiment, a method for separating a polymer from a solvent comprises introducing a superheated polymer-solvent mixture via a pressure control valve located on a barrel of an extruder, wherein the extruder comprises an upstream vent, a downstream vent, and a side feeder, wherein the side feeder comprises a side feeder vent and the upstream vent and the side-feeder vent are operated at about atmospheric pressure and the downstream vent is operated at subatmospheric pressure; removing solvent from the superheated polymer-solvent mixture via the upstream vent, the downstream vent and the side feeder vent; and isolating a polymer product from the polymer solvent mixture; wherein the polymer-solvent mixture comprises a polymer and a solvent.

In one embodiment, a method for separating a polymer from a solvent comprises introducing a superheated polymer-solvent mixture via a pressure control valve located on a side feeder attached to an extruder, wherein the extruder comprises a downstream vent, wherein the side feeder comprises a side feeder vent, wherein the pressure control valve is located between the extruder and the side feeder vent; removing solvent from the superheated polymer-solvent mixture via the downstream vent and the side feeder vent; and isolating a polymer product from the polymer solvent mixture; wherein the polymer-solvent mixture comprises a polymer and a solvent.

In one embodiment, a system for separating a polymer from a solvent, the system comprising a means for heating a polymer-solvent mixture, preferably to provide a superheated polymer-solvent mixture; an extruder in communication with the means for heating a polymer solvent mixture, the communication being via at least one feed inlet, preferably a pressure control valve through which a polymer-solvent mixture may be introduced into the extruder, the extruder being equipped with at least one upstream vent adapted for operation at atmospheric or subatmospheric pressure, and at least one down stream vent adapted for operation at subatmospheric pressure; and optionally at least one side feeder in communication with the extruder, the side feeder being equipped with at least one vent adapted for operation at atmospheric or subatmospheric pressure and optionally at least one pressure control valve through which the polymer-solvent mixture may be introduced into the extruder via the side feeder. As an example of what is meant by the expressions in communication with or to communicate with, the side feeder is said to be in communication with or to communicate with the extruder because the barrel of the side feeder is understood to intersect the barrel of the extruder allowing for the passage of solvent vapor generated in the extruder barrel outwards along the side feeder barrel out through the vent of the side feeder.

Means for heating a polymer-solvent mixture to provide a heated or superheated polymer-solvent mixture include heated feed tanks, heat exchangers, reaction vessels, all of which may or may not be pressurized, extruders, and the like.

The extruder in communication with the means for heating a polymer solvent mixture may be a twin-screw counter-rotating extruder, a twin-screw co-rotating extruder, a single-screw extruder, or a single-screw reciprocating extruder.

FIGS. 1 and 2 illustrate two exemplary embodiments of the disclosed system and method. FIG. 1 illustrates a system and a method comprising a nitrogen-pressurized, heated feed tank (1) for supplying a polymer-solvent mixture, a gear pump (2) for pumping the mixture though a flow meter (3) and heat exchanger (4). The heat exchanger provides heat (5) to provide a superheated polymer-solvent mixture (6) which is forced by the action of the gear pump through in-line filters (7) to remove particulate impurities from the superheated polymer-solvent mixture which passes through a pressure control valve (8) and a short connecting pipe (9) to the feed zone of a twin-screw extruder (10) having screw design (24). Extruder (10) is equipped with a side feeder (11) and nitrogen gas inlets (12) and (13). Upstream vent (14) and a side feeder vent (15) for removing solvent vapors (18) are located on barrel 1 (16), and the side feeder (11), respectively. The escaping solvent vapors (18) are captured in a solvent vapor manifold (19) connected to a condenser (20) where heat (5) is removed and solvent (21) is recovered. Downstream of barrel 4 (17) the extruder screw elements are configured to provide melt seals (29) in barrel 5 (23) and barrel 8 (30) respectively. Downstream vents (22), (26), (27) and (31) provide for the removal of solvent not removed through the upstream vents. Solvent vapors (18) and (32) are condensed and recovered at condensers (20), (33) and (34). The polymer product (35) emerges from the extruder for pelletization and further use.

FIG. 2 illustrates a portion of the system comprising a twin-screw extruder (36), side feeders (37) and (38), a feed inlet (39) comprising a pressure control valve, upstream vent (40), side feeder vents (50) located on the side feeders, kneading blocks (41) adapted for capturing solid polymer entrained by escaping solvent vapor, side feeder conveying screw elements (42) which provide for the transfer of polymer deposited in the side feeder to the screws of the twin-screw extruder, (43), (45) and (46) screw elements providing melt seals, and downstream vents (44), (47), (48) and (51) providing for removal of additional solvent.

In one embodiment additional precautions may be taken to exclude oxygen from the extruder and from contact with the hot polymer as it emerges from the extruder dieface. Such precautions may assist in preventing discoloration of the polymer product, especially when the polymer product is known to darken or otherwise degrade at high temperature in the presence of oxygen. For example, polyetherimides and poly(phenylene ethers) are known to be sensitive to oxygen at high temperature and darken measurably when heated in the presence of oxygen. Steps which may be taken in order to minimize the concentration of oxygen in the extruder, or to minimize the exposure of the hot polymer emerging from the extruder dieface to oxygen include: wrapping external parts of the extruder with cladding and supplying the cladding with a positive pressure of nitrogen, enclosing with a housing supplied with a positive pressure of inert gas those sections of the extruder subject to the entry of oxygen due to the action of vacuum the vents, enclosing the entire extruder in an enclosure supplied with a positive pressure of nitrogen, and the like. Additionally, steps may be taken to degas the polymer-solvent mixture prior to its introduction into the extruder. Degassing may be effected in a variety of ways, for example sparging the polymer-solvent mixture with an inert gas and thereafter maintaining a positive pressure of an inert gas in the vessel holding the polymer-solvent mixture.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight and temperature is in ° C.

Molecular weights are reported as number average ($M_n$) or weight average ($M_w$) molecular weight and were determined by gel permeation chromatography (GPC) using polystyrene (PS) molecular weight standards. Example 5 provides a general illustration of the method. ULTEM® 1010 polyetherimide is commercially available from GE Plastics, MT Vernon, Ind. Throughout the Examples and the Comparative Examples the system used to effect-polymer-solvent separation comprised a co-rotating, intermeshing (i.e. self wiping) twin-screw extruder.

Examples 1-4 and 6-7 were carried out using the same extruder devolatilization system and same 30 percent solution of polyetherimide in ODCB described in Example 5 below. Variations in the conditions employed are provided in Table 1.

Example 5

A polymer-solvent mixture containing about 30 percent by weight polyetherimide (ULTEM® 1010 polyetherimide; prepared by the nitro-displacement process) and about 70 percent by weight ortho-dichlorobenzene (ODCB) was prepared and heated to a temperature of 156° C. in a feed tank under a nitrogen atmosphere (50-60 psig $N_2$ or 3.5-4.2 kilogram-force per square centimeter ($kgf/cm^2$)). Nitrogen was used to provide enough pressure to feed the pump head of the gear pump. Additionally the nitrogen is believed to have inhibited degradation of the polymer in the solution. Air is not used because it may cause coloration and molecular weight change when the polymer-solvent mixture comprises air sensitive polymers such as polyetherimides. Additionally, the polymer-solvent mixture comprised the commercial stabilizers IRGAFOS® 168 (0.12 percent by weight based on the weight of the polymer) and IRGANOX® 1010 (0.10 percent by weight based on the weight of the polymer).

The solution was transferred from the heated feed tank by means of a gear pump at a rate of about 50 pounds of solution per hour (22.7 kilogram per hour (kg/hr)) to a heat exchanger maintained at about 288° C. The polymer-solvent mixture emerged from the heat exchanger at a temperature of about 261° C. and was fed through a pressure control valve plumbed into the upstream edge of barrel 3 of a 10-barrel, 25 mm diameter, co-rotating, intermeshing twin-screw extruder having a length to diameter ratio (L/D) of about 40. The cracking pressure of the pressure release valve was electronically controlled such that a steady stream of the superheated polymer-solvent mixture was introduced into the extruder. In this example (Example 5) the temperature of the polymer-solvent mixture as it was introduced into the extruder through the pressure control valve was 229° C., 49° C. higher than the boiling point of ODCB (boiling point 180° C.). The pressure control valve was operated with the cracking pressure set at about 86 psi (6.0 kgf/cm$^2$). The valve was 19 percent open. The extruder was operated at a screw speed of about 391 rpm, at about 45 percent of the maximum available torque, and at a die pressure of about 177 psi (12.4 kgf/cm$^2$). The measured extruder barrel temperatures were 330, 340, 339, 348, 332, and 340° C. for the six temperature-controlled zones in the extruder.

The extruder was equipped with a closed chamber upstream of barrel 1, the closed chamber having a nitrogen line adapted for the controlled introduction of nitrogen gas before and during the solvent removal process. The extruder was further equipped at barrel two with a side feeder positioned orthogonal to the barrel of the extruder. The side feeder was not heated, had an L/D of about 10, and comprised two screws consisting of forward conveying elements only. At the end most distant from the extruder barrel, the side feeder was equipped with a single atmospheric vent (V1). The conveying elements of the screws of the side feeder were configured to convey toward the extruder and away from the side feeder vent. The extruder was further equipped with two additional atmospheric vents at barrel 1 (V2) and barrel 4 (V3) and vacuum vents (vents operated at subatmospheric pressure) at barrel 6 (V4) and barrel 8 (V5). The three atmospheric vents, two on the extruder and one on the side feeder, were each connected to a solvent removal and recovery manifold comprising solvent vapor removal lines, a condenser, and liquid solvent receiving vessel. The vacuum vents were similarly adapted for solvent recovery. Vents V2 and V5 were equipped with Type A vent inserts while the vents V3 and V4 were equipped with Type C and Type B vent inserts respectively. Vent inserts are available from the Werner & Pfleiderer Company. Vent inserts differ in the cross sectional area available for the solvent vapors to escape the extruder: Type A inserts are the most restrictive (smallest cross section) and Type C are the most open (largest cross section). The vent on the side feeder V1 was not equipped with a vent insert.

The extruder screw elements consisted of both conveying elements and kneading elements. All of the conveying elements in both the extruder and the side feeder were forward flighted conveying elements. Kneading elements used included neutral, forward flighted and rearward flighted kneading elements depending on function. In barrels 2 and 3 of the extruder, kneading blocks consisting of forward and neutral flighted kneading elements were employed. Substantially all, about 95 percent or more, of the solvent was removed through the atmospheric vents.

That substantially all of the solvent was removed through the atmospheric vents (V1, V2, and V3) was determined as follows. The total amount of solvent collected from the atmospheric vents was measured after the experiments constituting Examples 1-7 were completed. The total amount of polymer-solvent mixture fed in Examples 1-7 was about 140 pounds (63.5 kg) comprising about 42 pounds (19.1 kg) of polymer and about 98 pounds (44.5 kg) of solvent. Of this, 97 pounds (44 kg) of solvent was recovered from the receiving vessel attached to the atmospheric vents (V1, V2 and V3), 0.8 pounds (0.36 kg) of solvent was recovered from a receiver attached to vacuum vent (V4), and 0.4 pounds (0.18 kg) of solvent was recovered from a receiver attached to vacuum vent (V5). Thus, about 98.5% of the total amount of solvent was removed through the atmospheric vents (V1, V2 and V3).

The extruder screws were equipped with melt seals consisting of kneading blocks made up of rearward flighted kneading elements. The melt seals were located at barrels 5, and 7. The vacuum vents were located downstream of the melt seals on barrel 6 and barrel 8 and were operated at vacuum levels of about 28 inches (about 711.2 millimeters (mm)) of mercury (a vacuum guage indicating full vacuum, or zero absolute pressure, would read about 30 inches (about 762.0 mm) of mercury (Hg)). The devolatilized polyetherimide, which emerged from the die face (melt temperature about 389° C.) of the extruder was stranded and pelletized. The pelletized polyetherimide (approximately 6 pounds or 2.7 kg) was found to contain about 334 ppm residual ODCB.

Data for Examples 1-7 are gathered in Table 1. In the column headed "Pressure (mm Hg)" values for the vacuum measured at vacuum vents V4 and V5 are given in millimeters of mercury. "T Feed after Heat Exch. (° C.)" indicates the temperature of the polymer-solvent mixture after passage through the heat exchanger. "P-valve (° C.)" indicates the temperature of the polymer-solvent mixture at the pressure control valve. "Cracking Pressure (kgf/cm$^2$)/% Open" provides the cracking pressure of the pressure control valve and the extent to which the pressure control valve is open, 100 meaning the valve is fully open and 20 meaning the valve opening cross sectional area is 20 percent of the opening cross sectional area of fully open valve. "Residual ODCB by GC (ppm)" provides the amount of residual ODCB in parts per million (ppm) remaining in the devolatilized polymer following pelletization and was determined by gas chromatography.

TABLE 1

| Example | Vacuum (mm Hg) V4 | Vacuum (mm Hg) V5 | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|
| 1 | 304.8 | 711.2 | 22.7 | 38 | 389 | 385 | 17.6 | 335/310/339/350/333/351 |
| 2 | 431.8 | 711.2 | 22.7 | 44 | 387 | 385 | 14.7 | 320/330/340/347/330/340 |
| 3 | 304.8 | 711.2 | 22.7 | 44 | 387 | 385 | 13.6 | 321/327/342/348/330/340 |
| 4 | 431.8 | 711.2 | 22.7 | 44 | 387 | 385 | 12.8 | 327/329/339/351/330/340 |
| 5 | 711.2 | 711.2 | 22.7 | 45 | 389 | 391 | 12.4 | 330/340/339/348/332/340 |
| 6 | 711.2 | 711.2 | 34.0 | 47 | 397 | 450 | 14.7 | 330/319/340/349/335/340 |
| 7 | 711.2 | 711.2 | 43.5 | 48 | 404 | 498 | 16.6 | 327/307/336/354/342/340 |

| Example | Feed Tank (° C.) | T feed after Heat Exch. (° C.) | P-valve (° C.) | Cracking Pressure (kgf/cm²)/% Open | T of Heating Oil for Heat Exchanger (° C.) | Residual ODCB by GC (ppm) |
|---|---|---|---|---|---|---|
| 1 | 159 | 191 | 183 | 0.35/100 |  | 598 |
| 2 | 159 | 232 | 189–195 | 6.2/20 | 254 | 560 |
| 3 | 160 | 250 | 205 | 6.3/20 | 288 | 434 |
| 4 | 156 | 267 | 221 | 6.6/20 | 288 | 587 |
| 5 | 156 | 261 | 229 | 6.0/19 | 288 | 334 |
| 6 | 157 | 264 | 225 | 6.0/20 | 288 | 604 |
| 7 | 158 | 260 | 215 | 6.8/20 |  | 969 |

The data in Table 1 illustrate the effectiveness of the method for separating a polymer from a large amount of solvent in a single step and providing a polymetric material, which is substantially free of solvent.

Examples 8-11 were carried out using the same extruder devolatilization system configured as in Example 5 using a freshly prepared polymer-solvent mixture identical to that employed in Example 5. Data for Examples 8-11 are gathered in Table 2 and illustrate the limits on the rate at which the polymer-solvent mixture may be introduced into the extruder. At the high feed rates employed in Examples 8-11 the separated polymer retains a higher level of solvent than was observed in Examples 1-7. The column headings in Table 2 have the same meanings as those of Table 1.

Examples 12-21 were carried out using the same extruder devolatilization system configured as in Example 5 (but including an in-line sintered metal filter upstream of the pressure control valve) using two freshly prepared polymer-solvent mixtures comprising 30 percent by weight polyetherimide in ODCB. Two different batches of polyetherimide prepared by the nitro displacement process were employed. The polyetherimide used to prepare the polymer-solvent mixture employed in Examples 12-18 and 20-21 was prepared in a pilot plant from the same chemical components (BPADA, m-phenylenediamine, and phthalic anhydride chainstopper), in the same proportions, as are used in the manufacture of commercially available ULTEM® polyetherimide. This pilot plant material had $M_w$=42,590 amu, $M_n$=18,270 amu, and a polydispersity (PI) value of 2.33. Commercially available ULTEM® polyetherimide was used in Example 19 and had $M_w$=44,250 amu, $M_n$=19,420 amu, and a polydispersity value of 2.28. Thus, each of the two polyetherimides employed was essentially identical in terms

TABLE 2

| Example | Vacuum (mm Hg) V4 | Vacuum (mm Hg) V5 | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|
| 8 | 711.2 | 711.2 | 47.6 | 53 | 395 | 433 | 23.7 | 317/323/323/345/329/329 |
| 9 | 711.2 | 711.2 | 47.6 | 52 | 398 | 471 | 22.2 | 315/340/328/350/331/330 |
| 10 | 711.2 | 711.2 | 49.9 | 54 | 397 | 471 | 22.8 | 317/340/336/346/330/330 |
| 11 | 711.2 | 711.2 | 68.0 | 55 | 409 | 600 | 21.7 | 319/336/338/347/334/331 |

| Example | Feed Tank (° C.) | T feed after Heat Exch. (° C.) | P-valve (° C.) | Residual ODCB by GC (ppm) | Solution YI (Corrected) |
|---|---|---|---|---|---|
| 8 | 161 | 252 | 203 | 2236 | 24.6 |
| 9 | 161 | 270 | 217.5 | 1420 | 24.7 |
| 10 | 165 | 267 | 221 | 1956 | 23.3 |
| 11 | 167 | 247 | 208 | 2514 | 23.2 | of chemical composition and molecular weight. The pilot plant material differed in one important respect from the commercial polyetherimide. The pilot plant material without being subjected to dissolution in ODCB and solvent removal exhibited a Dynatup Energy to maximum load value at 100°

C. of 33.99 ft-lb (46.08 Joule (J)) (standard deviation 18.59 ft-lb (25.20 J)), and was judged to be about 40 percent ductile. In the same test the commercial grade ULTEM® polyetherimide displayed a value of 53.43 ft-lb (72.44 J) (standard deviation 2.52 ft-lb (3.42 J)) and was 100 percent ductile. This somewhat poor ductility was attributable to the presence of particulate material (specks) in the pilot plant material. It is believed that these particles reduce the impact strength of a molded part by acting as stress concentrators when a plaque molded from the particle containing resin is impacted by a moving plunger in the Dynatup test. As shown by the data presented in Table 3, the ductility loss attributable to the presence of the specks in the pilot plant material could be recovered upon filtration of the polymer-solvent mixture prepared from the pilot plant material through a sintered metal filter (PALL 13-micron Filter) positioned between the heat exchanger and the pressure control valve.

Each of the two polymer-solvent mixtures comprised the commercial stabilizers IRGAFOS® 168 (0.12 percent by weight based on the weight of the polymer) and IRGANOX® 1010 (0.10 percent by weight based on the weight of the polymer). Some 400 pounds (181 kg) of the polymer-solvent mixture prepared from pilot plant polyetherimide was extruded in each of Examples 12-18 and 20-21. In Example 19 about 100 pounds (45.4 kg) of polymer-solvent mixture prepared from commercial ULTEM® polyetherimide was extruded. Data for Examples 12-21 are gathered in Table 3 and illustrate that the polymer-solvent mixture may be fed at high rates (about 75 pounds per hour or 34.0 kg/hr) while still achieving very low levels of residual solvent in the recovered polymer. Thus, the polymer emerging from the extruder was pelletized and the pellets were found to be substantially free (<1000 ppm) of ODCB. In the experiment forming the basis of Example 19, the extruded, pelletized product was sampled four times during the experiment to determine the level of residual ODCB, hence the presence of multiple values of "Residual ODCB by GC (ppm)" given in Example 19. Additionally, the extruded, pelletized product in Example 19 was sampled twice for Dynatup energy testing. All Dynatup tests were conducted using the standard ASTM method D3763 (conducted at 100° C.) on plaques molded from the extruded, pelletized product polyetherimide. Percent ductility was determined by examination of the failure mode of the part in the Dynatup test. Failure was judged to be either ductile failure or nonductile failure. Any failure in which the plaque broke into two or more parts was judged to be nonductile failure. A value of "Ten/100" under the heading "No. Samples/Ductile(%)" indicates that of the ten plaques tested in the Dynatup test, all ten plaques (or 100%) failed in a ductile manner. The column headings in Table 3 common to Tables 1 and 2 have the same meanings as those of Tables 1 and 2. The column heading "Dynatup Energy @ Max. Load/St. Dev. (J) @100C" gives the average Dynatup test value in joules and standard deviation obtained from the testing of ten molded plaques prepared from the polyetherimide isolated.

TABLE 3

| Example | Vacuum (mm Hg) V4 | Vacuum (mm Hg) V5 | Mass Flow (kg/hr) | Torque (%) | Melt (° C.) | Screw speed (rpm) | Die Pressure (kgf/cm$^2$) | Barrel Temperatures (° C.) |
|---|---|---|---|---|---|---|---|---|
| 12 | 711.2 | 711.2 | 34.0 | 48 | 392 | 449 | 24.0 | 308/324/357/331/329/329 |
| 13 | 711.2 | 711.2 | 34.0 | 49 | 393 | 449 | 21.9 | 310/265/335/354/331/330 |
| 14 | 711.2 | 711.2 | 33.6 | 48 | 394 | 453 | 23.6 | 324/289/361/351/331/330 |
| 15 | 711.2 | 711.2 | 33.6 | 49 | 394 | 453 | 21.7 | 326/266/348/351/330/330 |
| 16 | 711.2 | 711.2 | 34.0 | 49 | 394 | 453 | 24.3 | 328/303/350/350/330/330 |
| 17 | 711.2 | 711.2 | 34.0 | 49 | 394 | 453 | 22.4 | 331/281/350/351/330/330 |
| 18 | 711.2 | 711.2 | 34.0 | 50 | 394 | 453 | 22.7 | 330/303/347/354/331/330 |
| 19 | 711.2 | 711.2 | 34.0 | 52 | 400 | 453 | 24.2 | 331/336/351/356/338/330 |
| 20 | 711.2 | 711.2 | 34.0 | 46 | 389 | 400 | 25.5 | 337/320/391/357/324/330 |
| 21 | 711.2 | 711.2 | 34.0 | 48 | 388 | 400 | 23.5 | 336/318/365/348/323/330 |

| Example | Feed Tank (° C.) | T feed after Heat Exch. (° C.) | P-valve (° C.) | Cracking Pressure(kgf/cm$^2$)/ % Open | Residual ODCB by GC (ppm) | Dynatup Energy @ Max. Load/ St. Dev. (J) @100 C. | Number of Samples Tested/ Ductile (%) |
|---|---|---|---|---|---|---|---|
| 12 | 153 | 255 | 236 | 4.1/21 | 828 | 63.2/7.1 | Ten/90 |
| 13 | 159 | 260 | 235 | 4.1/19.5 | 636 | 66.8/3.1 | Ten/100 |
| 14 | 168 | 264 | 247 | 3.9/19.5 | 454 | 64.9/10.8 | Ten/80 |
| 15 | 168 | 279 | 250 | 4.1/19.5 | 358 | 55.3/19.0 | Ten/90 |
| 16 | 169 | 285 | 249 | 4.1/19.5 | 370 | 63.9/1.1 | Ten/100 |
| 17 | 170 | 284 | 251 | 4.0/19.5 | 411 | 64.0/0.8 | Ten/100 |
| 18 | 154 | 282 | 244 | 3.4/25 | | | |
| 19 | 159 | 282 | 244 | 3.4/25 | 306/238/520/219 | 69.7/2.0 | Ten/100 |
| | | | | | | 67.0/0.7 | Ten/100 |
| 20 | 155 | 282 | 242 | 3.3/25 | 229 | 64.3/0.4 | Ten/100 |
| 21 | 156 | 282 | 242 | 3.3/25 | 341 | 56.5/17.9 | Ten/80 |

In Examples 22-31 the extruder devolatilization system was configured as in Example 5 with the following modifications: A PALL 13-micron sintered metal filter was placed in the feed line between the heat exchanger and the pressure control valve (upstream of the pressure control valve), and the ten barrel twin-screw extruder was adapted to perform as an 8 barrel extruder. The following changes were made to the extruder. Barrels 1 and 2 were so-called blind barrels fitted with dummy space filling screw elements; the pressure control valve was attached to the extruder on the downstream edge of barrel 4; the side feeder was attached to the extruder at barrel 4; the atmospheric vents (V1, V2 and V3) were located on the side feeder as in Example 5, and on barrels 3 and 5 respectively; and the vacuum vents (V4) and (V5) were located on barrels 7 and 9 respectively. Type C inserts were used in vents (V2-V5). No vent insert was used in (V1), the atmospheric vent on the side feeder. As in Examples 1-21 the extruder screw elements included conveying elements under all vents, melt seal-forming left handed kneading blocks just upstream of each vacuum vent and narrow-disk right handed kneading blocks at the side feeder. Two polymer-solvent mixtures were employed. The first was used in Examples 22-26 and comprised a 30 percent solution of commercial ULTEM® 1010 polyetherimide in ODCB stabilized as in Example 5. ULTEM® 1010 polyetherimide was prepared using the nitro displacement process. The second polymer-solvent mixture was used in Examples 27-31 and was prepared using polyetherimide having a chemical structure essentially identical to that of ULTEM® polyetherimide, but prepared by the chloro displacement method. This second polymer-solvent mixture contained 30 percent by weight of chloro displacement polyetherimide in ODCB and was stabilized with IRGAFOS® 168 and IRGANOX® 1010 as in Example 5.

The data in Table 4 demonstrate that at moderately high feed rates (64-70 pounds of polymer-solvent mixture per hour or 29.0-31.8 kg/hr) product polyimide was obtained which was substantially free of residual ODCB solvent. In Examples 29 and 30 the chloro-displacement polyetherimide isolated showed both excellent ductility and was substantially free of solvent (<1000 ppm). Loss of ductility in Examples 27 and 28 is believed to have been due to the accretion and charring of small amounts of polymer at the vent openings during runs Examples 22-26 which gradually became dislodged as a result of the changeover to the second polymer-solvent mixture used in Examples 27-31. In one embodiment the extruder is equipped with a melt filter in order to minimize the effects of any such accretion and charring on the properties of the polymer product. The data given in Table 4 demonstrate that the method is applicable to polyetherimide prepared using either the nitro displacement or chloro displacement process without negatively affecting product quality. Moreover, using the 8-barrel extruder as practiced in Examples 22-31, the polymer-solvent mixture may be separated at lower melt temperature (about 365° C.) compared with melt temperatures observed when a 10-barrrel extruder is employed (385-405° C.) without increasing the solvent level in the polymer product above 1000 ppm.

Examples 32-37 (Table 5) were run using different feed rates, barrel temperatures and screw speeds on the extruder devolatilization system used in Examples 22-31. The polymer-solvent mixture employed was a 30 percent by weight solution of commercial ULTEM® 1010 polyetherimide in ODCB stabilized with IRGAFOS® 168 and IRGANOX® 1010 as in Example 5. In the experiment comprising Examples 32-37 about 180 pounds (81.6 kg) of polymer-solvent mixture was devolatilized, the feed rate gradually being increased to a maximum rate in Example 35 of 105 pounds per hour (47.6 kg/hr). At this maximum rate, the

TABLE 4

| Example | Vacuum (mm Hg) V4 | Vacuum (mm Hg) V5 | Mass Flow (kg/hr) | Torque (%) | Melt (° C.) | Screw speed (rpm) | Die Pressure (kgf/cm$^2$) | Barrel Temperatures (° C.) |
|---|---|---|---|---|---|---|---|---|
| 22 | 711.2 | 711.2 | 31.8 | 45 | 365 | 475 | 7.8 | 337/352/352/344/351/350/345/336 |
| 23 | 711.2 | 711.2 | 31.8 | 46 | 364 | 475 | 7.4 | 333/348/350/350/350/349/344/335 |
| 24 | 711.2 | 711.2 | 31.8 | 45 | 365 | 476 | 8.6 | 336/350/350/349/350/350/345/335 |
| 25 | 711.2 | 711.2 | 31.8 | 45 | 366 | 476 | 9.8 | 336/350/350/350/350/350/346/335 |
| 26 | 711.2 | 711.2 | 31.8 | 45 | 366 | 476 | 8.9 | 336/350/350/350/350/350/346/335 |
| 27 | 711.2 | 711.2 | 31.3 | 44 | 366 | 475 | 9.9 | 345/351/347/342/349/351/345/336 |
| 28 | 711.2 | 711.2 | 29.0 | 47 | 363 | 485 | 11.0 | 341/352/350/341/339/331/331/334 |
| 29 | 711.2 | 711.2 | 29.0 | 47 | 362 | 485 | 11.2 | 336/350/350/340/337/329/329/335 |
| 30 | 711.2 | 711.2 | 29.0 | 47 | 362 | 484 | 11.7 | 334/350/350/340/336/329/330/335 |
| 31 | 711.2 | 711.2 | 29.0 | 48 | 362 | 485 | 9.9 | 333/350/350/340/337/330/331/335 |

| Example | Feed Tank (° C.) | T feed after Heat Exch. (° C.) | P-valve (° C.) | Cracking Pressure (kgf/cm$^2$)/% Open | Residual ODCB by GC (ppm) | Dynatup Energy @ Max. Load/ St. Dev. (J) @100 C. | Number of Samples Tested/ Ductile (%) |
|---|---|---|---|---|---|---|---|
| 22 | 167 | 275 | 239 | 6.7/34 | | 27.1/21.7 | Ten/10 |
| 23 | 168 | 269 | 243 | 5.4/34 | | | |
| 24 | 160 | 278 | 244 | 7.4/33 | | 64.3/7.3 | Ten/100 |
| 25 | 162 | 275 | 245 | 6.5/33 | | | |
| 26 | 164 | 275 | 246 | 6.8/33 | 926 | 64.4/2.4 | Ten/100 |
| 27 | 155 | 253 | 231 | 5.1/35 | 865 | 56.0/20.6 | Ten/70 |
| 28 | 157 | 272 | 242 | 7.2/31 | 802 | 46.7/27.2 | Ten/60 |
| 29 | 157 | 273 | 245 | 6.7/31 | 754 | 64.4/10.3[a] | Ten/100[a] |
| 30 | 159 | 271 | 246 | 6.5/31 | 956 | | |
| 31 | 162 | 269 | 246 | 6.6/31 | — | — | — |

[a]Measured on a composite sample prepared from material isolated in Examples 29 & 30 atmospheric vent at barrel 5 (V3) plugged. Thereafter the feed rate was lowered and the data for Examples 36 and 37 collected. In Example 37 all of the extruder barrel temperature controllers (heating and cooling) were turned off to simulate performance under adiabatic conditions. In Example 33 the throughput rate was increased 65 to 85 pounds per hour (29.5 to 38.6 kg/hr). Under the conditions indicated (melt temperature about 372° C. and a screw speed of about 500 rpm) the polymer product while containing only a small amount of residual ODCB solvent, contained more than the maximum value targeted in the experiment, 1000 ppm. In Example 34 it was shown that by adjusting the extruder barrel temperature and the screw speed upward the amount of residual ODCB in the polymer product could be brought to under 500 ppm. Even at the highest throughput rate achievable, Example 35, the amount of residual solvent present in the polymer product could be maintained at a level under 1000 ppm. Example 36 was run to equilibrate the system following Example 35. Example 37 demonstrates that the method may be carried out using an extruder operated under adiabatic conditions and still provide product which is substantially free of solvent.

introduced into the extruder through a pressure control valve located on the downstream edge of barrel 2. The screw design was essentially the same as that used in the previous Examples. Conveying elements were located under the pressure control valve and under all vents, left-handed kneading blocks were located just upstream of vacuum vents (V4) and (V6) to provide melt seals upstream of vacuum vents (V4) and (V6), and forward and neutral kneading blocks were located in barrels 2 and 3. As in Example 5, the system comprised a heated feed tank pressurized with nitrogen gas, and a gear pump used to transfer the polymer-solvent mixture from the feed tank, through a heat exchanger and a pressure control valve attached to the extruder. Additionally, the system comprised a pair of in-line sintered metal filters (PALL 13 micron filters) operated in parallel, the filters being positioned between the heat exchanger and the pressure control valve. In Examples 38-45 extruder temperature control was aided by alternately heating and air cooling the extruder barrel in order to simulate isothermal conditions. The extruder was adapted for the introduction of nitrogen gas as described in Example 5. Nitrogen gas was bled into the extruder during all runs.

TABLE 5

| Example | Vacuum (mm Hg) V4 | V5 | Mass Flow (kg/hr) | Torque (%) | Melt (° C.) | Screw speed (rpm) | Die Pressure (kgf/cm$^2$) | Barrel Temperatures (° C.) |
|---|---|---|---|---|---|---|---|---|
| 32 | 711.2 | 711.2 | 29.5 | 45 | 366 | 452 | 6.8 | 328/350/351/349/373/342/332/351 |
| 33 | 711.2 | 711.2 | 38.6 | 47 | 372 | 500 | 8.5 | 322/348/351/343/352/346/340/350 |
| 34 | 711.2 | 711.2 | 38.6 | 43 | 411 | 750 | 1.8 | 331/381/374/357/377/378/379/352 |
| 35 | 711.2 | 711.2 | 47.6 | 43 | 413 | 750 | 5.1 | 331/378/378/351/375/380/379/351 |
| 36 | 711.2 | 711.2 | 29.9 | 41 | 393 | 500 | 1.9 | 333/374/376/369/379/370/365/348 |
| 37 | 711.2 | 711.2 | 29.9 | 43 | 385 | 505 | 2.4 | 272/310/298/297/354/364/354/350 |

| Example | Feed Tank (° C.) | T feed after Heat Exch. (° C.) | P-valve (° C.) | Cracking Pressure (kgf/cm$^2$)/% Open | Residual o-DCB by GC (ppm) |
|---|---|---|---|---|---|
| 32 | 153 | 262 | 238 | 6.2/45 | 876 |
| 33 | 154 | 278 | 242 | 8.4/45 | 1478 |
| 34 | 156 | 276 | 240 | 8.6/44 | 479 |
| 35 | 160 | 269 | 240 | 8.8/44 | 833 |
| 36 | 161 | 278 | 237 | 8.2/43 | 770 |
| 37 | 163 | 276 | 238 | 7.6/43 | 861 |

Examples 38-45 illustrate the system used to perform extruder devolatilization of polymer-solvent mixtures comprises a 10 barrel, 25 mm diameter, co-rating, intermeshing twin-screw extruder having a length to diameter ratio (L/D) of 40, a side feeder having an L/D of 10 attached to barrel 2 of the extruder, and six vents (V1-V6) arrayed on the extruder and the side feeder. Vents (V1), (V2), and (V3) were atmospheric vents and were located on the side feeder, barrel 1, and barrel 4 respectively. Atmospheric vents (V1-V3) were connected as in Example 5 to a solvent recovery system to which a very slight vacuum (about 1 inch of mercury (about 25.4 mm Hg)) was applied in order to enhance solvent removal through the upstream vents, (V1-V3). Vents (V4), (V5) and (V6) were vacuum vents and were attached to the extruder at barrel 5, barrel 7 and barrel 9 respectively. Vacuum vents (V4), and (V5) and (V6) were connected to two solvent recovery systems independent of that used for the atmospheric vents (V1-V3). Vents (V3-V6) comprised Type C vent inserts. No vent inserts were used in vents (V1) and (V2). The polymer-solvent mixture was In Examples 38, 39, 44 and 45 the polymer-solvent mixtures were 30 percent by weight solutions of ULTEM® 1010 polyetherimide in ODCB, the solutions being stabilized as in Example 5. The polymer solvent mixtures used in Examples 44 and 45 contained, in addition, DOVERPHOS® F2028 (0.10 weight percent based on the weight of polymer). The polymer-solvent mixture employed in Examples 40-43 was an ODCB solution of polyetherimide prepared by the chloro displacement process, the polyetherimide having a structure essentially identical to the ULTEM® 1010 polyetherimide employed in Examples 38, 39, 44 and 45, except that the ratios of 3-substituted and 4-substituted imide groups varied slightly. The chloro displacement polyetherimide isolated in Examples 40-43 was prepared starting with a 90:10 mixture of 4-chloro- and 3-chlorophthalic anhydride. The polymer-solvent mixture used in Examples 40-43 was about 25 percent by weight polyetherimide in ODCB and was stabilized as in Example 5.

TABLE 6

| Example | Vacuum (mm Hg) V4 | V5 | V6 | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|---|
| 38 | 711.2 | 711.2 | 711.2 | 30.4 | 48 | 368 | 450 | 4.6 | 342/327/350/350/351/356/347/350 |
| 39 | 711.2 | 711.2 | 711.2 | 30.4 | 49 | 361 | 400 | 8.0 | 356/330/350/350/350/350/345/335 |
| 40 | 711.2 | 711.2 | 711.2 | 27.7 | 49 | 369 | 400 | 6.3 | 342/325/346/352/349/355/340/351 |
| 41 | 711.2 | 711.2 | 711.2 | 29.5 | 51 | 361 | 400 | 9.9 | 365/335/351/351/345/349/342/335 |
| 42 | 711.2 | 711.2 | 711.2 | 29.5 | 50 | 360 | 400 | 11.3 | 354/331/346/350/343/350/346/336 |
| 43 | 711.2 | 711.2 | 711.2 | 29.5 | 49 | 363 | 400 | 9.4 | 352/333/350/352/349/354/351/336 |
| 44 | 711.2 | 711.2 | 711.2 | 29.9 | 52 | 362 | 430 | 6.9 | 347/334/352/352/346/350/344/335 |
| 45 | 711.2 | 711.2 | 711.2 | 29.9 | 50 | 364 | 430 | 7.7 | 343/331/351/350/347/350/349/335 |

| Example | Feed Tank (° C.) | T feed after Heat Exch. (° C.) | P-valve (° C.) | Cracking Pressure (kgf/cm²)/% Open | Residual ODCB by GC (ppm) | Dynatup Energy @ Max. Load/ St. Dev. (J) @100 C. | Number of Samples Tested/ Ductile (%) |
|---|---|---|---|---|---|---|---|
| 38 | 161 | 269 | 258 | 6.4/15 | 293 | 67.1/11.1 | Ten/90 |
| 39 | 161 | 270 | 258 | 6.7/14 | 369 | 66.4/1.4 | Ten/100 |
| 40 | 139 | 265 | 251 | 6.8/21 | 432[a] | 62.8/6.4[a] | Ten/80[a] |
| 41 | 142 | 281 | 248 | 6.6/18 | | | |
| 42 | 145 | 270 | 252 | 6.8/20 | 438[b] | 66.8/3.9[b] | Ten/100[b] |
| 43 | 149 | 277 | 252 | 6.6/19 | | | |
| 44 | 139 | 277 | 259 | 6.6/14 | 345[c] | 66.3/1.9[c] | Ten/100[c] |
| 45 | 150 | 266 | 264 | 6.8/15 | | | |

[a]Data was gathered on a combined sample taken from Examples 40 and 41.
[b]Data was gathered on a combined sample taken from Examples 42 and 43.
[c]Data was gathered on a combined sample taken from Examples 44 and 45.

The data gathered for Examples 38-45 in Table 6 demonstrate both the effectiveness of solvent removal by the method as measured by the amount of residual ODCB present in the polymer product. Additionally, Dynatup testing demonstrates the retention of ductility among polymers isolated by the method.

In Examples 46-53 the extruder devolatilization system was configured as in Examples 38-45. Examples 46-49 were carried out on a 30 percent by weight solution of commercially available ULTEM® 1010 polyetherimide in ODCB. Examples 50-53 were carried out on a 30 percent by weight solution of polyetherimide prepared by chloro displacement having a structure nearly identical to that used in Examples 46-49. The polyetherimide used in Examples 50-53 was prepared from a 95:5 mixture of 4-chloro- and 3-chlorophthalic anhydride. Both polymer-solvent mixtures were stabilized as in Example 5. Data gathered in Table 7 illustrate the efficient separation of the solvent from the polymer-solvent mixture.

TABLE 7

| Example | Vacuum (mm Hg) V4 | V5 | V6 | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|---|
| 46 | 711.2 | 711.2 | 711.2 | 30.8 | 55 | 367 | 475 | 6.5 | 343/325/347/353/352/343/349/335 |
| 47 | 711.2 | 711.2 | 711.2 | 30.8 | 54 | 374 | 475 | 6.0 | 364/332/350/350/350/351/350/335 |
| 48 | 711.2 | 711.2 | 711.2 | 30.8 | 54 | 374 | 476 | 6.3 | 366/333/351/349/350/350/350/330 |
| 49 | 711.2 | 711.2 | 711.2 | 30.8 | 54 | 375 | 475 | 6.3 | 360/333/350/351/350/350/350/330 |
| 50 | 711.2 | 711.2 | 711.2 | 30.8 | 59 | 379 | 475 | 8.4 | 358/332/350/351/350/349/350/349 |
| 51 | 711.2 | 711.2 | 711.2 | 31.8 | 59 | 378 | 475 | 8.6 | 353/330/350/351/350/351/350/349 |
| 52 | 711.2 | 711.2 | 711.2 | 31.8 | 58 | 378 | 475 | 8.4 | 351/332/351/350/351/350/350 |
| 53 | 711.2 | 711.2 | 711.2 | 31.8 | 58 | 379 | 475 | 8.4 | 351/333/352/351/350/351/350/350 |

| Example | Feed Tank (° C.) | P-valve (° C.) | % Open[a] | Residual ODCB by GC (ppm) | Dynatup Energy @ Max. Load/ St. Dev. (J) @100 C. | Number of Samples Tested/ Ductile (%) |
|---|---|---|---|---|---|---|
| 46 | 163 | 256 | /16 | — | — | — |
| 47 | 165 | 261 | /16.2 | — | — | — |
| 48 | 170 | 268 | /13 | 438 | 75.1/3.3[b] | Ten/90[b] |
| 49 | 168 | 264 | /13 | 212 | | |
| 50 | 165 | 258 | /20 | 387[c] | 65.4/20.9[c] | Ten/90[c] |
| 51 | 164 | 260 | /20 | | | |

TABLE 7-continued

| | | | | | | |
|---|---|---|---|---|---|---|
| 52 | 167 | 258 | /20 | 316 | 73.8/2.2[d] | Ten/100[d] |
| 53 | 167 | 260 | /20 | 422 | | |

[a]Value given is the extent to which the pressure control valve is open expressed as a percentage of the cross sectional area of the fully open valve orifice.
[b]Data was gathered on a combined sample taken from Examples 48 and 49.
[c]Data was gathered on a combined sample taken from Examples 50 and 51.
[d]Data was gathered on a combined sample taken from Examples 52 and 53.

The polymer product in Examples 48-49 and 51-53 is substantially free of residual ODCB. In addition, there were no differences in performance of the recovered commercial polyetherimide (Examples 48 and 49) and the recovered chloro displacement product (Examples 50 and 51, and Examples 52 and 53) in the Dynatup and ductility measurement test.

In Examples 55 and 56 chloro displacement polyetherimide ($M_w$=62400 amu, $M_n$=24200 amu), prepared by condensation of a 25:75 mixture of 4-chloro and 3-chlorophthalic anhydride with 4,4'-oxydianiline to afford the corresponding bisimide followed by chloro-displacement polymerization reaction with the disodium salt of bisphenol A, was isolated from a polymer-solvent mixture comprising 30 percent by weight polymer in ODCB. Example 54 served as a control and employed a 30 percent by weight solution of commercially available nitro displacement polyetherimide, ULTEM® 1010, in ODCB. The solutions were stabilized as in Example 5. The extruder devolatilization system was the same as that employed in Examples 46-53. The data gathered in Table 8 illustrate that the ductility of the chloro displacement polymer product in Examples 55 and 56 is not adversely affected when the method is employed to effect its isolation from ODCB solution.

In Examples 57-59 the present method was applied to the isolation of polysulfones from a polymer-solvent mixture. Two polymer-solvent mixtures comprising polysulfones were employed. In Example 57 a polymer-solvent mixture comprising 30 percent by weight of a commercial polysulfone, UDEL-1700 (available from Solvay Advanced Polymers, Alpharetta, Ga., USA), in ODCB was subjected to the present method using an extruder devolatilization system configured as in Examples 38-45. No additional stabilizers were added to the polymer-solvent mixture prepared from the commercially available polysulfone. In Examples 58 and 59 a polymer-solvent mixture was employed which comprised 30 percent by weight polysulfone in ODCB solution, the polymer-solvent mixture being stabilized as in Example 5. The polysulfone in Examples 58 and 59 was prepared by reaction of 4,4'-dichlorodiphenylsulfone with the disodium salt of bisphenol A in ODCB under standard polysulfone polymerization conditions. The polysulfone employed in Examples 58 and 59 had $M_w$=58100 amu and $M_n$=18100 amu. The data in Table 9 demonstrate that the present method is applicable to the separation of polymer-solvent mixtures comprising polysulfones, and that the properties of the product polysulfones so isolated are not adversely affected.

TABLE 8

| | Vacuum (mm Hg) | | | Mass Flow | Torque | | Screw speed | Die Pressure | Barrel |
|---|---|---|---|---|---|---|---|---|---|
| Example | V4 | V5 | V6 | (kg/hr) | (%) | Melt (° C.) | (rpm) | (kgf/cm²) | Temperatures (° C.) |
| 54 | 635 | 711.2 | 736.6 | 31.8 | 55 | 376 | 525 | 4.2 | 370/334/350/349/351/350/350/351 |
| 55 | 635 | 711.2 | 736.6 | 31.8 | 58 | 383 | 525 | 9.8 | 373/334/350/351/350/350/352/349 |
| 56 | 635 | 736.6 | 736.6 | 32.2 | 59 | 381 | 525 | 10.9 | 344/329/350/350/350/350/348/348 |

| Example | Feed Tank (° C.) | P-valve (° C.) | Cracking Pressure (kgf/cm²)/% Open | Dynatup Energy @ Max. Load/St. Dev. (J) @100 C. | Number of Samples Tested/ Ductile (%) |
|---|---|---|---|---|---|
| 54 | 150 | 274 | 8.9/16 | | |
| 55 | 166 | 274 | 9.9/17 | 66.4/12.0[a] | Ten/100[a] |
| 56 | 149 | 275 | 8.9/18 | | |

[a]Data was gathered on a combined sample taken from Examples 55 and 56.

TABLE 9

| Example | Vacuum (mm Hg) | | | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|---|
| | V4 | V5 | V6 | | | | | | |
| 57 | 711.2 | 711.2 | 711.2 | 31.8 | 55 | 384 | 525 | 0.84 | 352/332/350/350/350/349/357/331 |
| 58 | 711.2 | 711.2 | 711.2 | 31.8 | 49 | 380 | 525 | TLTM[a] | 347/330/350/349/350/348/352/330 |
| 59 | 711.2 | 711.2 | 711.2 | 31.8 | 50 | 383 | 524 | TLTM | 352/331/351/350/350/350/350/330 |

| Example | Feed Tank (° C.) | P-valve (° C.) | Cracking Pressure (kgf/cm²)/ % Open | Residual ODCB by GC (ppm) | Dynatup Energy @ Max.Load/ St. Dev.(J) @RT[b] | Number of Samples Tested/ Ductile (%) |
|---|---|---|---|---|---|---|
| 57 | 161 | 261 | 9.8/21 | 213 | — | — |
| 58 | 158 | 263 | 9.5/18 | — | 61.1[c] | Ten/100[c] |
| 59 | 161 | 264 | 9.2/18 | 196 | | |

[a]Die pressure was Too Low to Measure (TLTM)
[b]RT is room temperature
[c]Data was gathered on a combined sample taken from Examples 58 and 59.

In Examples 60-65 the present method was applied to the isolation of polycarbonate from a polymer-solvent mixture. A polymer-solvent mixture was prepared comprising 30 percent by weight commercially available bisphenol A polycarbonate (LEXAN® 120 polycarbonate, available from GE-Plastics, Mt. Vernon, Ind.) in ODCB. The polymer-solvent mixture comprising polycarbonate was subjected to the present method using an extruder devolatization system configured as in Examples 38-45 with the exception that no PALL filters were used. No additional stabilizers were added to the polymer-solvent mixture prepared from the commercially available polycarbonate. The data in Table 10 demonstrate that the present method is applicable to the recovery of polycarbonate from polymer-solvent mixtures comprising polycarbonate, and that polymer product having very low levels of residual solvent are achievable. Under the conditions of Examples 60-65, slightly higher levels of residual solvent were observed in the product polycarbonate than were observed in the polyetherimide and polysulfone products. This may be due to the lower temperatures employed in Examples 60-65 (melt temperatures 300-325° C. versus 375-400° C.). It should be stressed that a very low level of residual solvent has been achieved in Examples 60-65 by the present method, the level of residual solvent exceeding 1000 ppm notwithstanding.

TABLE 10

| Example | Vacuum (mm Hg) | | | Mass Flow (kg/hr) | Torque (%) | Melt (° C.) | Screw speed (rpm) | Die Pressure (kgf/cm²) | Barrel Temperatures (° C.) |
|---|---|---|---|---|---|---|---|---|---|
| | V4 | V5 | V6 | | | | | | |
| 60 | 533.4 | 685.8 | 685.8 | 34.0 | 40 | 303 | 550 | TLTM[a] | 282/266/276/281/282/281/282/277 |
| 61 | 533.4 | 685.8 | 685.8 | 34.0 | 37 | 311 | 550 | TLTM | 332/295/301/300/292/303/307/261 |
| 62 | 533.4 | 685.8 | 685.8 | 34.5 | 37 | 308 | 500 | TLTM | 343/295/300/301/304/300/296/259 |
| 63 | 533.4 | 685.8 | 685.8 | 38.6 | 37 | 314 | 500 | TLTM | 345/295/298/300/307/300/301/261 |
| 64 | 533.4 | 685.8 | 685.8 | 38.6 | 33 | 324 | 500 | TLTM | 354/324/329/324/317/323/338/261 |
| 65 | 533.4 | 685.8 | 685.8 | 38.6 | 33 | 325 | 550 | TLTM | 358/337/347/329/327/326/320/260 |

| Example | T feed @ Feed Tank (° C.) | T feed after Heat Exch. (° C.) | P-valve (° C.) | Cracking Pressure (kgf/cm²)/% Open | Residual ODCB by GC (ppm) |
|---|---|---|---|---|---|
| 60 | 167 | 274 | 271 | 7.0/18 | 1934 |
| 61 | 168 | 274 | 271 | | 1518 |
| 62 | 160 | 276 | 272 | 6.0/17 | 1670 |
| 63 | 168 | 269 | 267 | 8.5/16 | 1675 |
| 64 | 169 | 270 | 267 | 8.9/16 | 1437 |
| 65 | 172 | 270 | 267 | 9.3/16 | 1385 |

[a]Die pressure was Too Low to Measure (TLTM).

Examples 66-67 illustrate the application of the present method to the isolation of a polycarbonate ester-polyetherimide blend (Example 67). Two polymer-solvent mixtures were prepared and subjected to the present method. The first, which served as a control, was a 30 percent by weight solution of ULTEM® 1010 polyetherimide in ODCB. The second polymer-solvent mixture was a solution prepared from 22.5 pounds (10.2 kg) of ULTEM® 1010 polyetherimide and 7.5 pounds (3.4 kg) of the polycarbonate ester PCE in 70 pounds (31.8 kg) of ODCB. Each solution was stabilized as in Example 5. PCE is a copolycarbonate comprising bisphenol A residues and iso- and terephthalic acid residues joined by ester and carbonate linkages such that repeat units comprising ester linkages constitute about 60 percent of the weight of the polymer, and repeat units comprising carbonate linkages constitute about 40 percent of the weight of the polymer. PCE is sold as a blend with polyetherimide under the trade name ATX200F and is available from GE Plastics. Each of the polymer-solvent mixtures was subjected to the present method using the extruder devolatilization system employed in Examples 38-45 with the exception that n PALL filter was used in either Example 66 or 67. The data in Table 11 illustrate both the low level of residual solvent achievable in PCE/polyetherimide blends formed using the present method. In addition, the physical properties of the PCE/polyetherimide blend isolated by the method are consonant with the properties of and identical blend prepared using conventional extruder melt bending techniques.

eter ratio (L/D) of 44. The extruder screw elements were configured analogously to the configuration used in Examples 38-45 with melt seal generating elements located at the upstream edge of barrel 6, the downstream edge of barrel 7 and at the center of barrel 9. The polymer-solvent mixture was introduced into the feed zone of the extruder through a pressure control valve at the downstream edge of barrel 2. Solvent removed through the atmospheric vents (V1-V4) was collected at a first series of condensers. Solvent removed through vacuum vents (V5-V8) was collected at a second series of condensers. As in earlier Examples it was noted that most of the solvent was recovered through the atmospheric vents (V1-V4) (See column heading "Solvent Flashed Upstream (% of total)" in Table 12). The data in Table 12 illustrate that very low levels of residual anisole

TABLE 11

| Example | Vacuum (mm Hg) | | | Mass Flow (kg/hr) | Torque (%) | Melt (° C.) | Screw speed (rpm) | Die Pressure (kgf/cm$^2$) | Barrel Temperatures (° C.) |
|---|---|---|---|---|---|---|---|---|---|
| | V4 | V5 | V6 | | | | | | |
| 66 | 711.2 | 711.2 | 711.2 | 31.8 | 54 | 382 | 525 | TLTM | 356/331/350/350/350/350/351/350 |
| 67 | 711.2 | 711.2 | 711.2 | 31.8 | 55 | 370 | 600 | TLTM | 344/304/321/323/327/329/338/347 |

| Example | Feed Tank (° C.) | P-valve (° C.) | Cracking Pressure (kgf/cm$^2$)/ % Open | Residual ODCB by GC (ppm) | RT$^a$ Izod Impact Strength (J/m) | | | Maximum Tensile Strain (%) | Steady-state Viscosity @ 350 C. (Pa·s) | |
|---|---|---|---|---|---|---|---|---|---|---|
| | | | | | Notched | Reverse Notched | Un-Notched | | at 100 (1/s) | at 800 (1/s) |
| 66 | 160 | 279 | 11.2/15 | | 37.4 | 900.9 | 1378.8 | 26.81 | 1856 | 1018 |
| 67 | 162 | 259 | 12.1/16 | 327 | 58.7 | 2987.7 | 3713.4 | 34.95 | 1441 | 752 |

$^a$Room Temperature Izod Impact Strength

Examples 68-73 were carried out using two polymer-solvent mixtures comprising about 15 weight percent and about 30 weight percent ULTEM® 1000 polyetherimide in anisole (See column heading "Solids %"). The extruder devolatilization system used was analogous to that used in Examples 38-45 but included a second side feeder at barrel 2, an additional extruder barrel and two additional vents for solvent removal. The second side feeder was located on the opposite side of the extruder directly across barrel 2 from the first side feeder. Atmospheric vents were located at barrel 1 (V1), on the first side feeder (V2), on the second side feeder (V3) and at barrel 5 (V4). Vacuum vents were located on barrel 6 (V5), barrel 8 (V6), barrel 10 (V7) and barrel 11 (V8). The extruder itself was a 40 mm diameter, co-rotating, intermeshing twin-screw extruder having a length to diamcan be achieved using the present method, even at very high polymer-solvent mixture feed rates. It should, however, be noted that because of the high melt temperatures of Examples 68-73, the molecular weight or other physical property of the polymer product may be significantly different from the polymer initially present in the polymer-solvent mixture. Samples taken from the polymer product in Examples 68-73 showed up to a 12 percent increase in molecular weight and up to a 90 percent increase in viscosity relative to an ULTEM® 1000 polyetherimide control which was not subjected to the isolation by the present method. For a given polymer system, the optimum melt temperature which balances residual solvent level against the preservation of polymer physical properties can be readily determined by experimentation.

TABLE 12

| Example | Screw Speed (rpm) | Polymer-Solvent Mixture Feed Rate (kg/hr) | Melt (° C.) | Solids % | P-valve (° C.) | Solvent Flashed Upstream (% of total) | Residual Anisole (ppm) | Mw/Mn/PDI | Low-shear Rate Viscosity @ 340° C. (P) |
|---|---|---|---|---|---|---|---|---|---|
| 68 | 500 | 204 | 468 | 16.7 | 240 | 78 | 113 | | |
| 69 | 500 | 156 | 469 | 15.7 | 254 | 90 | 22 | | |
| 70 | 500 | 46.7 | | 30 | 222 | | <5 | 59900/21840/2.74 | ~71000 |
| 71 | 500 | 130 | 480 | 30.6 | 248 | 85 | 105 | 54760/21860/2.51 | 48000 |
| 72 | 500 | 155 | 478 | 30.9 | 247 | 84 | <5 | 56960/22130/2.57 | ~61000 |
| 73 | 500 | 238 | 482 | 31.1 | 226 | 88 | 195 | 55500/22720/2.44 | 51100 |
| Control[a] | | | | | | | | 53690/22910/2.34 | 37200 |

[a]ULTEM ® 1000 polyetherimide

In Examples 74-75 two different grades (Grades#1 and 2) of commercially available ULTEM® polyetherimide were dissolved in ODCB to form polymer-solvent mixtures comprising 30 percent by weight polyetherimide. The solutions were subjected to extruder devolatilization according to the present method and the polyetherimides were recovered. Examples 74 and 75 were carried out on an 8-barrel, 5-vent extruder and a 10 barrel 6 vent extruder respectively. The conditions employed in each case were essentially the same as in Example 39. The recovered polyetherimides were subjected to a battery of physical tests and the results were compared with the results of the same tests carried out on samples of the same grade of ULTEM® polyetherimide which had not been subjected to extruder devolatilization (See "Commercial Controls", Table 13). Data are gathered in Table 13 which show no significant impact of extruder devolatilization according to the present method on the properties of the product polyetherimide.

TABLE 13

| | EXAMPLE | | | |
|---|---|---|---|---|
| | ULTEM ® 1010 Grade#1 | 74 Grade#1 | ULTEM ® 1010 Grade#2 | 75 Grade#2 |
| Comments | Commercial Control | Extrusion isolated | Commercial Control | Extrusion isolated |
| Molecular Weight and Residual Solvent | | | | |
| $M_w$ (1000's) | 44.7/43.8 | 44.3 | 44.4 | 44.2 |
| $M_n$ (1000's) | 19.6/19.2 | 19.4 | 19.7 | 19.6 |
| PI | 2.28/2.27 | 2.28 | 2.25 | 2.25 |
| ODCB (ppm) | | 344 | | 369 |
| Rheology | | | | |
| $\eta_o$ at 340° C. (P) | 17100 | 16800 | 18000 | 17000 |
| Color/Visual | | | | |
| Solution YI | | 15.8 | 11.9 | 12.5 |
| Thermal | | | | |
| $T_g$ (° C.) | 217.0 | 216.5 | 216.6 | 215.3 |

TABLE 13-continued

| | EXAMPLE | | | |
|---|---|---|---|---|
| | ULTEM ® 1010 Grade#1 | 74 Grade#1 | ULTEM ® 1010 Grade#2 | 75 Grade#2 |
| Mechanical | | | | |
| Dynatup Impact @ 100° C. | | | | |
| Total % Ductile | 100 | 100 | 100 | 100 |
| Energy @ Max Load (J) | 63.6 | 65.2 | 70.8 | 66.4 |
| Standard Deviation (J) | 2.3 | 0.94 | 3.3 | 1.4 |

Thus, the polyetherimide recovered from the polymer-solvent mixture has essentially the same physical characteristics as the commercial product. In Table 13 molecular weight data for the "Commercial Control" "Grade#1" is given as a range of molecular weights. Thus, the significance of "44.7/43.8" is that the weight average molecular weight of the grade#1 commercial control may vary from about 43,800 amu to about 44,700 amu. The Dynatup measurements are reported as the average value from 10 measurements.

Comparative Examples 1-7 illustrate extruder devolatilization of a polymer-solvent mixture using an alternate extruder configuration. In Comparative Examples 1-7 the system used to perform the devolatilization was a 10 barrel, 25 mm diameter, co-rotating, intermeshing twin-screw extruder having an L/D of 40. The extruder had 5 vacuum vents (V1-V5) located at barrels 1, 3, 5, 7, and 9 respectively. The upstream vacuum vents (V1) and (V2) were operated at relatively low vacuum (vacuum gauge reading of about 5 to about 10 inches of mercury or about 127.0 to about 254 mm Hg). Vacuum vents (V3), (V4) and (V5) were operated under high vacuum (vacuum gauge reading of about 29 inches of mercury or about 736.6 mm Hg). Solvent vapors removed through vacuum vents (V1) and (V2) were collected separately from solvent vapors removed through vents (V3), (V4) and (V5). The polymer-solvent mixture used was a 30 percent by weight solution of ULTEM® 1010 polyetherimide. In Comparative Examples 1-7 the polymer-solvent mixture was transferred by nitrogen gas pressure from a heated feed tank held at 180° C. to a gear pump which forced the hot polymer-solvent mixture through a pipe which was hard plumbed to the feed inlet of the extruder. Data are presented in Table 14 which demonstrate that because there is no superheating of the polymer-solvent mixture prior to its introduction into the extruder low feed rates and relatively high melt temperatures are required in order to achieve low levels of residual ODCB in the recovered polymer. Thus, the method of separating a polymer-solvent mixture using the method of Comparative Examples 1-7 is shown to be less efficient than the present method.

solution was continuously fed to an extruder from the tank using a gear pump. The extruder used was a 25 mm diameter co-rotating, intermeshing extruder of the twin-screw type comprising 10 barrels (L/D=40) and six vents for the elimination of volatile components. The solution was fed to the extruder at the downstream edge of barrel number 2. Solvent removal occurred through the six vents located at barrel numbers 1 (V1), 2 (on a side feeder, V2), 4 (V3), 5 (V4), 7 (V5) and 9 (V6). (V3-V6) contained Type C vent inserts. Vents (V1-V2) were operated at about atmospheric pressure and vents (V3-V6) were operated at about 711 millimeters of Hg of vacuum. The vents were connected to a solvent removal and recovery system. Conveying elements were used under the feed port and all of the vents. Left-handed kneading blocks were positioned before vacuum vents (V4) and (V6) to seal the screw, and narrow-disk right-handed kneading blocks and neutral kneading blocks were positioned in barrels 2 and 3. Finally, the air cooling manifold and barrel heaters on the extruder were turned on during the experiment to achieve isothermal conditions.

The process was run at about 39.5 lb/hr (17.9 kg/hr) of solution (90 rpm of pump speed), 403 rpm extruder screw speed, and 34-35% of drive torque. The polymer was extruded through a 2-hole die plate and pelletized. The processing conditions for Examples 76-77 are provided in Table 15.

TABLE 14

| Comparative Example | Extruder Barrel Temp. (° C.) | Polymer-Solvent Mixture Feed Rate (kg/hr) | Screw Speed (rpm) | Torque (%) | Die Pressure (kgf/cm$^2$) | Melt (° C.) | Residual ODCB by GC (ppm) | Molecular Weight(Mw/ 1000)$^a$ (1 St. Dev.) |
|---|---|---|---|---|---|---|---|---|
| CE-1 | 350 | 6.8 | 325 | 36 | 14.1–17.6 | 394 | 121 | 45.57 (0.28) |
| CE-2 | 350 | 11.3 | 325 | 43 | 21.1–24.6 | 394 | 342 | 44.33 (0.18) |
| CE-3 | 350 | 11.3 | 500 | 40 | 14.8–17.6 | 414 | 542 | 45.81 (0.59) |
| CE-4 | 400 | 6.8 | 350 | — | — | — | 102 | 45.77 (0.78) |
| CE-5 | 400 | 11.3 | 350 | 39 | 61.2–65.4 | 409 | 204 | 45.05 (0.03) |
| CE-6 | 400 | 11.3 | 450 | 36 | 45.7–52.0 | 423 | 201 | 45.72 (0.56) |
| CE-7 | 400 | 13.4 | 550 | 37 | 36.9–43.9 | 439 | 210 | 46.33 (0.26) |
| ULTEM ® 1010 Control | | | | | | | | 45.44 (0.73) |

$^a$Mean of three determinations.

Examples 76-77 were prepared to illustrate the isolation of a polyetherimide-polyphenylene ether blend from an ODCB solution of polyetherimide and polyphenylene ether. The solution for Examples 76-77 was prepared from a stirred mixture containing 24 pounds (10.9 kg) of 0.46 IV PPO, 36 pounds (16.3 kg) of ULTEM® 1010, lot UD9796 and 140 pounds (63.5 kg) of ODCB. The solution was maintained in a heated feed tank at about 160° C. under a nitrogen atmosphere (80-100 psig N$_2$ or 5.6-7.0 kilogram-force per square centimeter (kgf/cm$^2$)). A feed stream of

TABLE 15

| Example | Solution Mass Flow Rate (kg/hr) | Torque (%) | Melt T (° C.) | Screw speed (rpm) | Die Pressure (kgf/cm$^2$) | Actual Barrel Temperatures (° C.) | T of feed in tank (° C.) | Residual ODCB by GC (ppm) |
|---|---|---|---|---|---|---|---|---|
| 76 | 17.9 | 34 | 354 | 403 | 4.0 | 355/326/331/331/329/ 333/324/330 | 161 | |
| 77 | 17.9 | 35 | 350 | 403 | 2.5 | 356/325/330 × 2/329/ 328/322/330 | 163 | 1204 |

Figure 3:
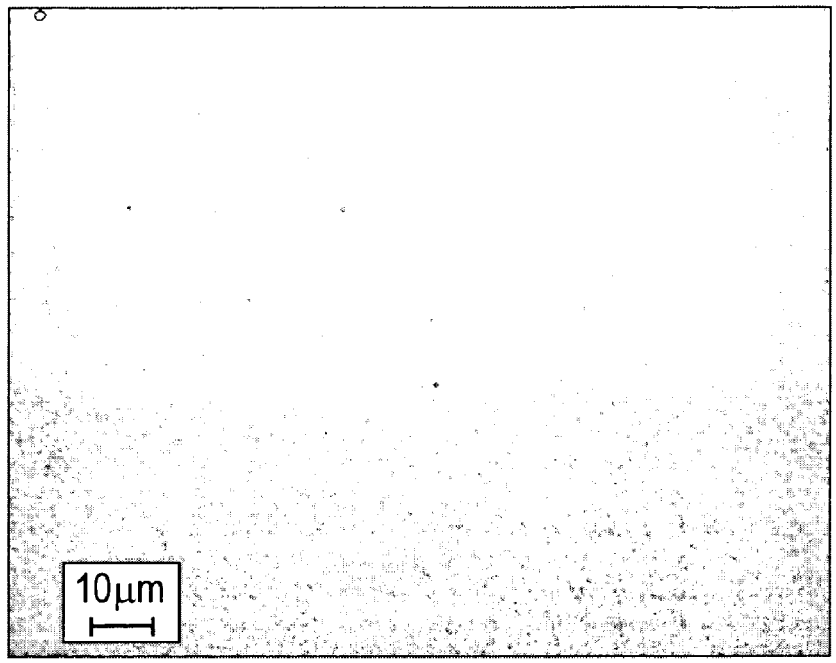
FIGS. 3 and 4 are SEM micrographs of polyetherimide-polyphenylene ether blend isolated from a solution.
Figure 4:
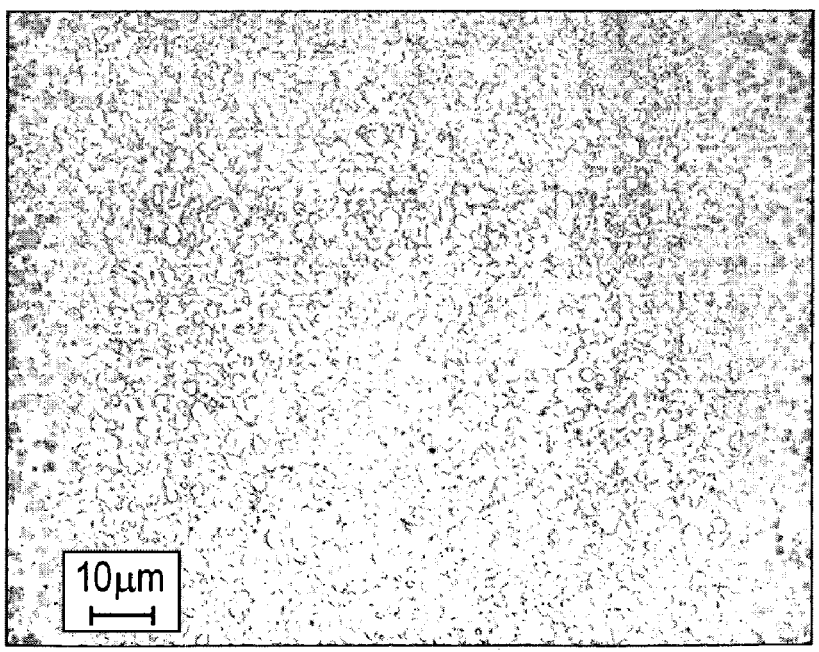

Scanning electron microscope (SEM) images (FIGS. 3 and 4) of two different samples of extruded material show a uniform dispersion of polyphenylene ether particles of about one micrometer in a continuous phase of polyetherimide. This result is surprising considering that there was limited mixing of the materials in the extruder due to the mild screw design and reduced residence time of the polymer in the extruder. The uniform dispersion of the polyphenylene ether was effected in the stirred tank used to prepare the solution.

Examples 78-80 were prepared to illustrate the isolation of a polyetherimide-fumed silica composite from an ODCB solution of polyetherimide and fumed silica. The solution for Examples 78-80 was prepared from a stirred mixture containing 28 pounds (12.7 kg) of ULTEM® 1010, lot UD9796, 72 pounds (32.7 kg) of ODCB, 2.8 pounds (1.3 kg) of fumed silica 88318 manufactured by GE Silicones, Waterford, N.Y., and 20 pounds (9.1 kg) of ODCB used to wet the fumed silica prior to its addition into the tank. The solution was maintained in a heated feed tank (about 165° C.) while a feed stream of solution was continuously fed to an extruder from the tank using a gear pump. The extruder used was a 25 mm diameter co-rotating, intermeshing extruder of the twin-screw type comprising 14 barrels (L/D=56) and six vents for the elimination of volatile components. The solution was fed to the extruder at the upstream edge of barrel number 4 through a port designed for liquid injection. Solvent removal occurred through the six vents located at barrel numbers 1 (V1), 5 (V2), 7 (V3), 9 (V4), 11 (V5) and 13 (V6). Vents (V1-V4) contained Type C vent inserts. Vents (V1-V4) were operated at about 711 millimeters of Hg of vacuum (house vacuum system) while vents (V5-V6) were operated at about 737 millimeters of Hg of vacuum (vacuum pump). Vent (V2) plugged immediately upon start up of the run. The vents were connected to a solvent removal and recovery system. Conveying elements were used in the extruder screws under the feed port and all of the vents. Kneading blocks were used in the extruder screws in the zones between all of the vents.

The process was run at about 43.8 lb/hr (19.9 kg/hr) of solution, 309 rpm extruder screw speed, and 83-84% drive torque. The filled polymer composite was extruded through a 2-hole die plate and pelletized. The extrudate contained about 9.1 percent by weight fumed silica based on the total weight of the composite. The processing conditions for Examples 78-80 are provided in Table 16.

The Dynatup tests were conducted on the composite material using the standard ASTM D3763 method (conducted at 100° C.) on plaques molded from the extruded, pelletized product polyetherimide-fumed silica. The column heading "Dynatup Energy @ Max. Load/St. Dev. (J) @100C" gives the average Dynatup test value in joules and standard deviation obtained from the testing of ten molded plaques prepared from the isolated polyetherimide-fumed silica composite. The results from the testing of the composite (PEI-fumed silica) and a control sample of ULTEM® 1010 lot UD9796 is provided in Table 17.

TABLE 17

| Example | Dynatup Energy @ Max. Load/St. Dev. (J) @100 C. | Total Energy/St. Dev. (J) @100 C. | Number of Samples Tested/ Ductile (%) | CTE (1/° C.) |
|---|---|---|---|---|
| PEI-fumed silica | 55.9/13.6 | 76.5/9.4 | Ten/100 | $38.9 \times 10^{-6}$ |
| ULTEM® 1010 | 82.6/9.4 | 89.2/7.7 | Ten/50 | $66.4 \times 10^{-6}$ |

The results of a ductility study of the composite material and the control sample of ULTEM® 1010 is shown in Table 17. It should be noted that the ductility of ULTEM® 1010 of 50% at 100° C. is atypical for this resin as it normally is around 100% when tested under these conditions.

Also provided in Table 17 is the coefficient of thermal expansion for the isolated polyetherimide-fumed silica material as well as commercially available ULTEM® 1010. Samples were tested using a Perkin Elmer TMA7 thermomechanical analyzer. These results highlight the beneficial effect of using fumed silica to reduce the expansion coefficient of the polyetherimide.

FIG. 5 is a graph of rheology data for the isolated polyetherimide-fumed silica composite as well as a control sample of ULTEM® 1010. FIG. 5 provides viscosity data based on samples cut from injection molded Dynatup plaques, and tested using low-amplitude oscillatory measurements on a Rheometrics RDAIII rheometer. The samples were dried in a vacuum oven for 2 days at 170° C. prior to testing, molded into disks at 320° C., and dried an additional 2 days at 170° C. The results indicate that the

TABLE 16

| Example | Solution Mass Flow Rate (kg/hr) | Torque (%) | Melt T (° C.) | Screw speed (rpm) | Die Pressure (kgf/cm²) | Actual Barrel Temperatures (° C.) | T of feed in tank (° C.) |
|---|---|---|---|---|---|---|---|
| 78 | 19.9 | 84 | 387 | 309 | TLTM[a] | 313/353/340/349/350/ 350/350/349/349 | 164 |
| 79 | 19.9 | 83 | 389 | 309 | TLTM | 316/350/340/350 × 3/ 349/350/351 | 163 |
| 80 | 19.9 | 84 | 389 | 309 | TLTM | 318/350/340/350 × 6 | 166 |

[a]The pressure transducer at the extruder die plate may have been damaged, which may have caused it to read a low pressure for the duration of the experiment silica-filled polymer was more viscous than the unfilled resin, particularly at the lower deformation rates (frequencies) investigated.

The invention has been described in detail with particular reference to preferred embodiments thereof, but it will be understood by those skilled in the art that variations and modifications can be effected within the spirit and scope of the invention.

What is claimed is:

1. A method of preparing a filled polymer, comprising:
   introducing a heated mixture comprising polymer, filler, and solvent to an extruder, wherein the extruder comprises an upstream vent and a downstream vent; and
   removing solvent from the heated mixture via the upstream vent and the downstream vent to form a filled polymer comprising the filler dispersed therein;
   wherein the polymer of the heated mixture and of the filled polymer is polyetherimide, polycarbonate ester, poly(arylene ether), polyamide, polyester, polysulfone, polyetherketone, polyimide, polysiloxane, liquid crystalline polymer, or a combination comprising at least one of the foregoing polymers.

2. The method of claim 1, wherein the filler is fumed or fused silica; crystalline silica; talc; glass fibers; carbon black; conductive fillers; carbon nanotubes; nanoclays; organoclays; or a combination comprising at least one of the foregoing fillers.

3. The method of claim 1, wherein the extruder further comprises a side feeder, wherein the side feeder comprises a side feeder vent operated at about 750 mm of Hg or greater or about 750 mm of Hg or less, and wherein the side feeder further comprises a kneading block.

4. The method of claim 1, wherein the filler is present in the filled polymer in an amount of up to about 50 weight percent based on the total weight of the filled polymer.

5. The method of claim 1, wherein the filler is present in the filled polymer in an amount of up to about 20 weight percent based on the total weight of the filled polymer.

6. The method of claim 1, wherein the solvent is a halogenated aromatic solvent, a halogenated aliphatic solvent, a non-halogenated aromatic solvent, a non-halogenated aliphatic solvent, or a combination comprising at least one of the foregoing solvents.

7. The method of claim 1, wherein the amount of polymer and filler in the mixture is less than or equal to about 75 weight percent based on the total weight of the mixture.

8. The method of claim 1, wherein the amount of polymer and filler in the mixture is about 5 to about 60 percent by weight based on the total weight of the solids mixture.

9. The method of claim 1, wherein the mixture is superheated prior to introducing the mixture to the extruder.

10. The method of claim 9, wherein the mixture is superheated to a temperature of about 2° C. to about 200° C. higher than the boiling point of the solvent at atmospheric pressure.

11. The method of claim 1, wherein about 50 to about 99 percent of the solvent present in the mixture is removed through the upstream vent.

12. The method of claim 1, wherein about 1 to about 50 percent of the solvent present in the mixture is removed through the downstream vent.

13. The method of claim 1, wherein the upstream vent is operated at about 750 mm of Hg or greater or about 750 mm of Hg or less, and wherein the downstream vent is operated at about 750 mm of Hg or less.

14. The method of claim 1, wherein the extruder is operated at a temperature of about 200 to about 400 degrees centigrade.

15. The method of claim 1, wherein the upstream vent is positioned upstream from a feed inlet.

16. The method of claim 1, wherein the extruder comprises one or more additional downstream vents.

17. The method of claim 16, wherein the extruder comprises a conveying element under a feed inlet and under the vents; and a kneading block in the zones between the vents.

18. A method of preparing a filled polymer, comprising:
    introducing a heated mixture comprising polymer, filler, and solvent to an extruder, wherein the extruder comprises an upstream vent and two or more downstream vents, and wherein the extruder optionally comprises a side feeder operated as a side vent;
    removing solvent from the heated mixture via the upstream vent and the downstream vents to form a filled polymer comprising the filler dispersed therein, wherein the filler is present in the filled polymer in an amount of up to about 50 weight percent based on the total weight of the filled polymer; and
    wherein the polymer of the heated mixture and of the filled polymer is polyetherimide, polycarbonate ester, poly(arylene ether), polyamide, polyester, polysulfone, polyetherketone, polyimide, polysiloxane, liquid crystalline polymer, or a combination comprising at least one of the foregoing polymers.

19. A filled polymer prepared by the method of claim 1.

20. The method of claim 1, wherein the polymer further comprises polycarbonate, poly(alkenyl aromatic), or a combination thereof.

* * * * *